(12) United States Patent
Uzawa

(10) Patent No.: US 11,520,135 B2
(45) Date of Patent: Dec. 6, 2022

(54) OBJECTIVE OPTICAL SYSTEM, AND OPTICAL SYSTEM FOR RIGID ENDOSCOPE AND RIGID ENDOSCOPE USING THE SAME

(71) Applicant: OLYMPUS CORPORATION, Hachioji (JP)

(72) Inventor: Tsutomu Uzawa, Hidaka (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/120,569

(22) Filed: Dec. 14, 2020

(65) Prior Publication Data

US 2021/0096352 A1 Apr. 1, 2021

Related U.S. Application Data

(63) Continuation of application No. PCT/JP2018/022908, filed on Jun. 15, 2018.

(51) Int. Cl.
*G02B 23/24* (2006.01)
*G02B 9/04* (2006.01)
(Continued)

(52) U.S. Cl.
CPC .............. *G02B 23/243* (2013.01); *G02B 9/04* (2013.01); *G02B 13/0095* (2013.01);
(Continued)

(58) Field of Classification Search
CPC ........ G02B 9/04–10; G02B 9/62; G02B 9/64; G02B 23/243; G02B 23/2446;
(Continued)

(56) References Cited

U.S. PATENT DOCUMENTS 5,005,957 A 4/1991 Kanamori et al.
5,050,974 A * 9/1991 Takasugi .................. G02B 9/62
359/728
(Continued)

FOREIGN PATENT DOCUMENTS

JP H03039915 A 2/1991
JP H03200911 A 9/1991
(Continued)

OTHER PUBLICATIONS

International Search Report (ISR) (and English translation thereof) dated Sep. 11, 2018 issued in International Application No. PCT/JP2018/022908.
(Continued)

*Primary Examiner* — Nicholas R. Pasko
(74) *Attorney, Agent, or Firm* — Holtz, Holtz & Volek PC

(57) ABSTRACT

An objective optical system includes in order from an object side, a front unit having a positive refractive power and a rear unit. The front unit includes in order from the object side, a first lens having a negative refractive power, a second lens having a positive refractive power, and a third lens having a positive refractive power. The rear unit includes one lens or a plurality of lenses and the following conditional expression is satisfied:

$$|(FLag-FLaC)/FLad|<0.05 \quad (1)$$

where,
FLad denotes a focal length for a d-line of the front unit,
FLag denotes a focal length for a g-line of the front unit, and
FLaC denotes a focal length for a C-line of the front unit.

8 Claims, 25 Drawing Sheets

(51) Int. Cl.
    *G02B 13/00*     (2006.01)
    *G02B 25/00*     (2006.01)
    *G02B 13/18*     (2006.01)
    *G02B 13/02*     (2006.01)

(52) U.S. Cl.
    CPC ..... *G02B 23/2446* (2013.01); *G02B 23/2461* (2013.01); *G02B 25/001* (2013.01); *G02B 13/02* (2013.01); *G02B 13/18* (2013.01)

(58) Field of Classification Search
    CPC .... G02B 13/02; G02B 13/04; G02B 13/0045; G03B 13/02; G03B 13/04; G03B 13/0045
    See application file for complete search history.

(56) References Cited

U.S. PATENT DOCUMENTS

| | | | | |
|---|---|---|---|---|
| 5,059,009 A * | 10/1991 | McKinley | .......... | G02B 23/2446 359/708 |
| 5,119,238 A | 6/1992 | Igarashi | | |
| 5,412,504 A * | 5/1995 | Leiner | ................ | G02B 23/2407 359/434 |
| 5,916,148 A * | 6/1999 | Tsuyuki | ............. | A61B 1/00181 600/175 |
| 6,206,825 B1 * | 3/2001 | Tsuyuki | ............. | A61B 1/00096 600/129 |
| 6,327,101 B1 * | 12/2001 | Miyano | ................... | G02B 9/34 359/659 |
| 7,944,625 B2 * | 5/2011 | Hatada | .................. | G02B 13/04 359/753 |
| 8,773,783 B2 * | 7/2014 | Maetaki | ................ | H04N 5/225 348/340 |
| 8,947,789 B2 | 2/2015 | Miyano | | |
| 9,810,877 B2 | 11/2017 | Makino et al. | | |
| 2014/0015999 A1 | 1/2014 | Miyano | | |
| 2016/0223782 A1 | 8/2016 | Makino et al. | | |
| 2019/0121117 A1 | 4/2019 | Amanai et al. | | |
| 2020/0069159 A1 | 3/2020 | Uzawa | | |

FOREIGN PATENT DOCUMENTS

| | | |
|---|---|---|
| JP | H04315118 A | 11/1992 |
| JP | H10115788 A | 5/1998 |
| JP | H11142729 A | 5/1999 |
| JP | 2012163831 A | 8/2012 |
| JP | 2015118136 A | 6/2015 |
| JP | 2016103035 A | 6/2016 |
| JP | 2017196283 A | 11/2017 |
| JP | 2017221658 A | 12/2017 |
| WO | 2012127826 A1 | 9/2012 |

OTHER PUBLICATIONS

Written Opinion dated Sep. 11, 2018 issued in International Application No. PCT/JP2018/022908.

International Preliminary Report on Patentability (IPRP) (and English language translation thereof) dated Dec. 15, 2020 issued in International Application No. PCT/JP2018/022908.

Japanese Office Action (and English language translation thereof) dated Dec. 1, 2021, issued in counterpart Japanese Application No. 2020-525057.

* cited by examiner

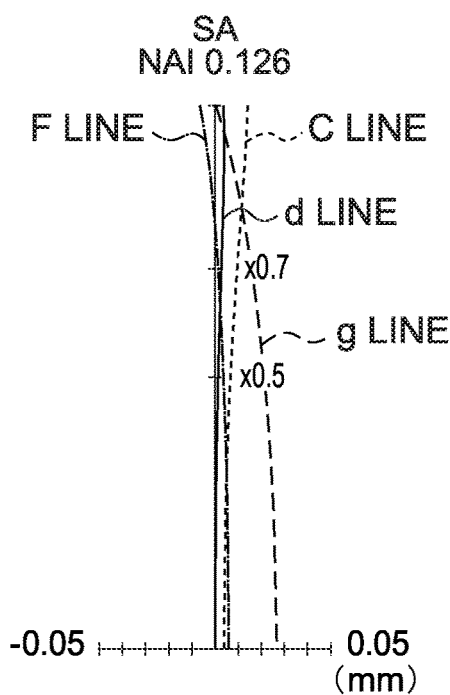
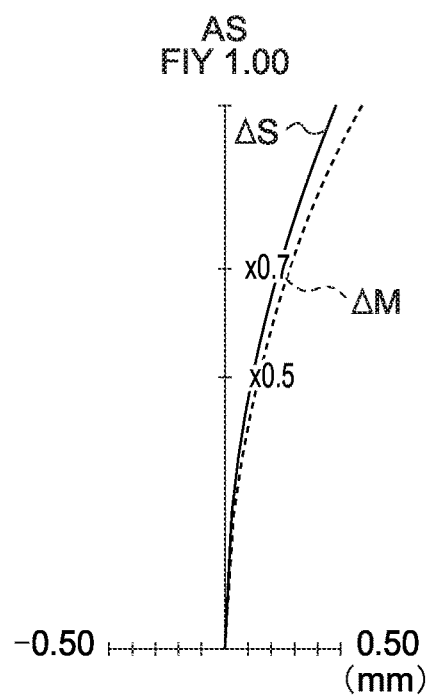
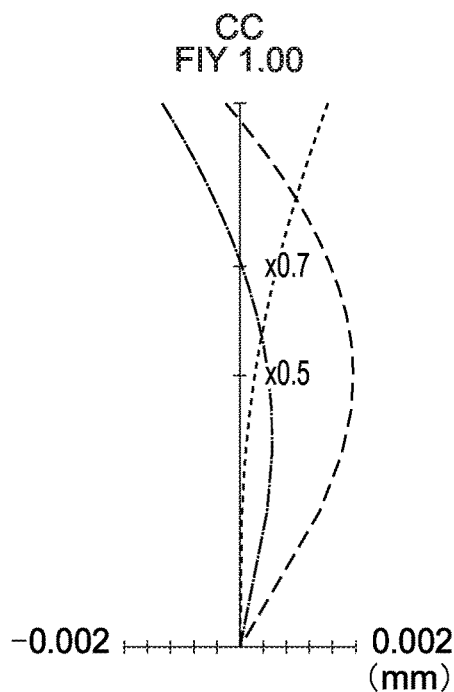
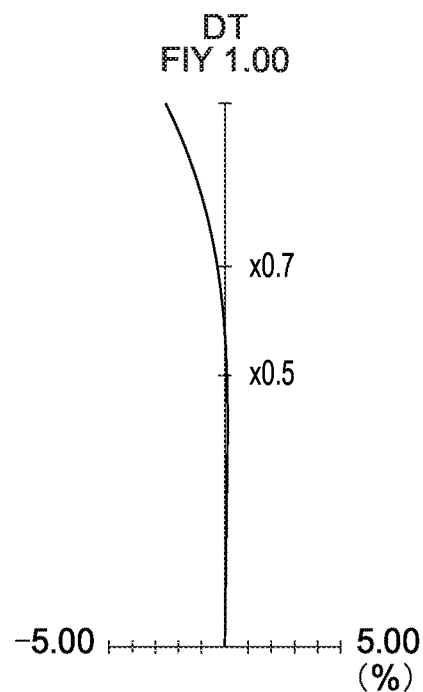

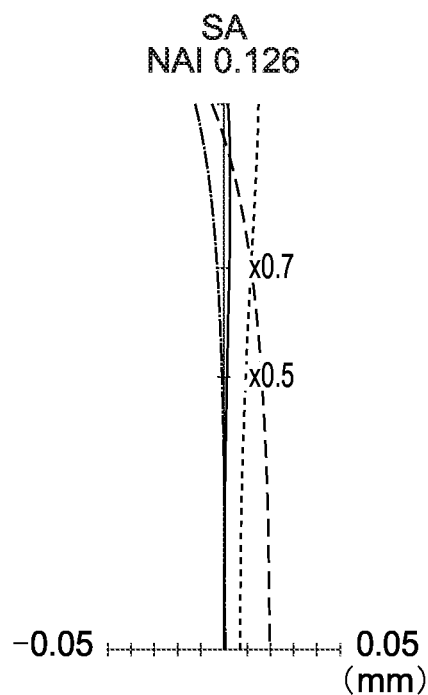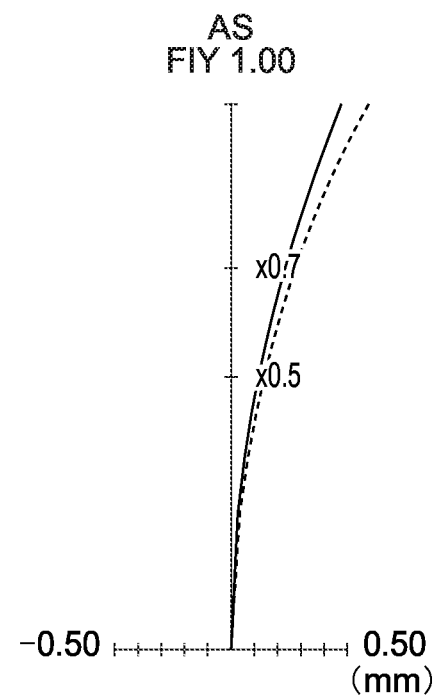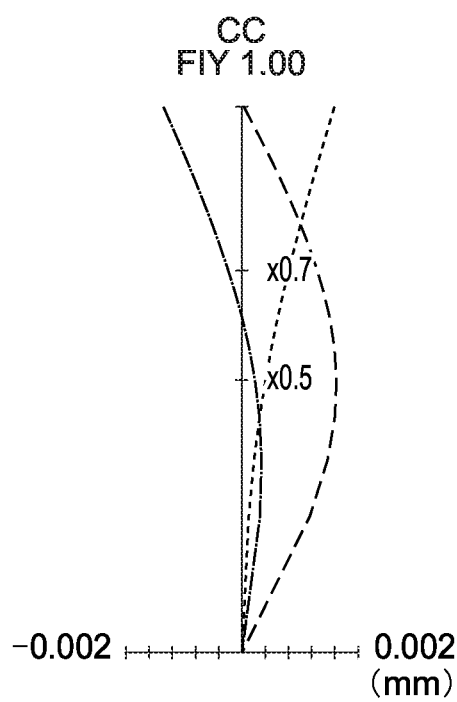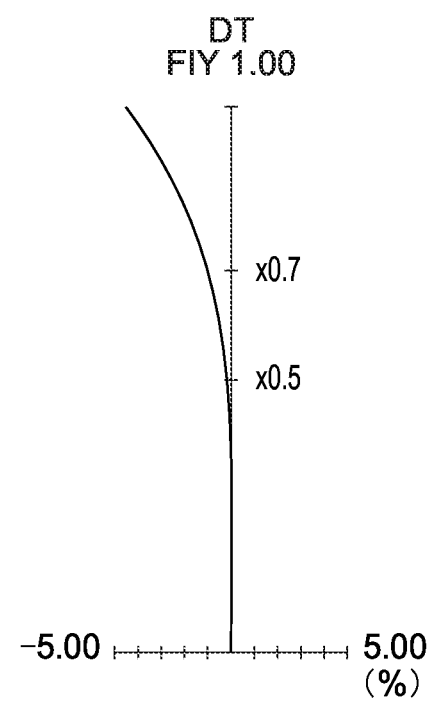

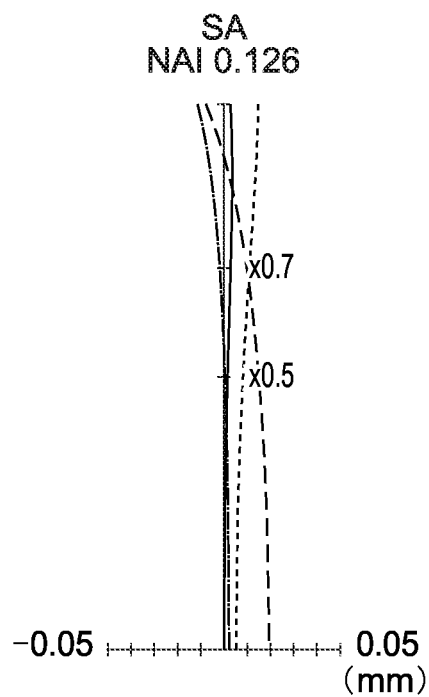
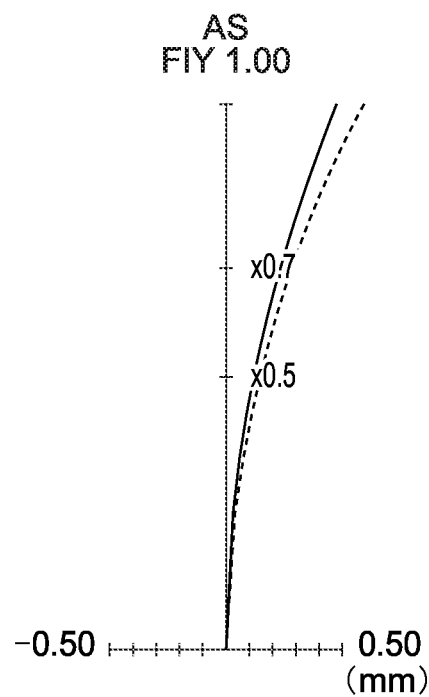
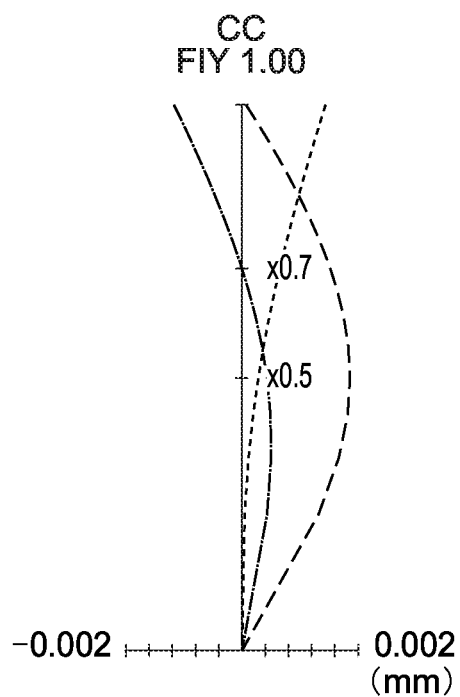
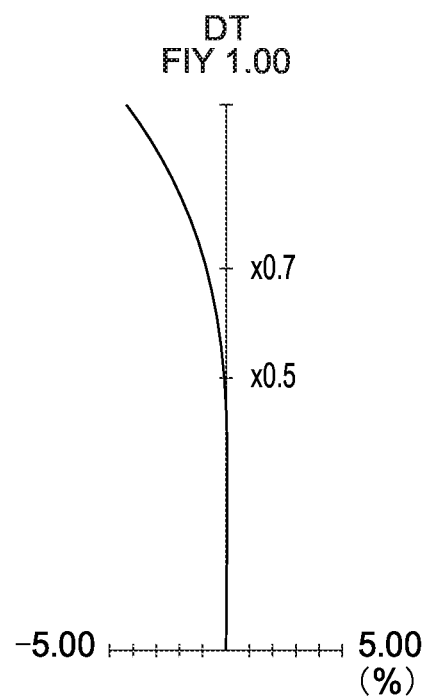

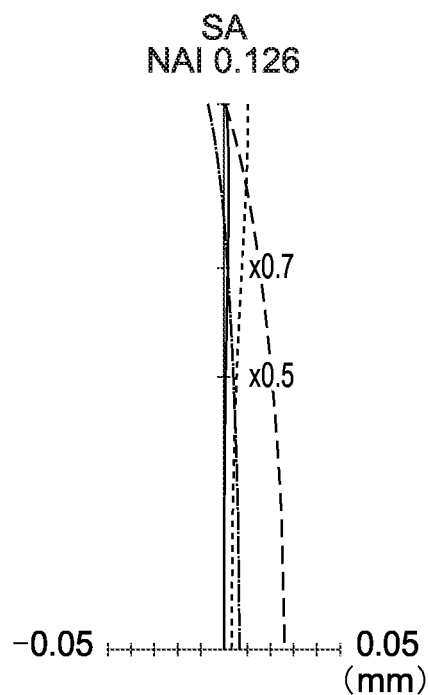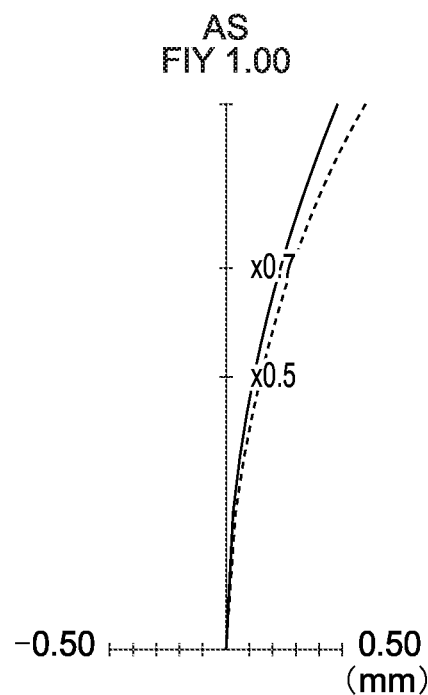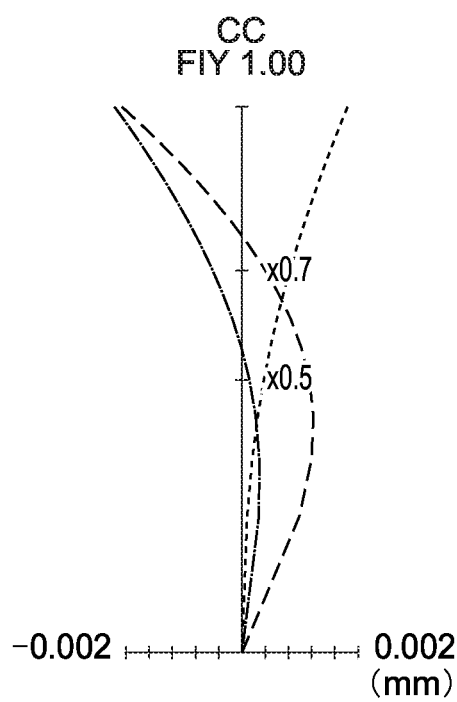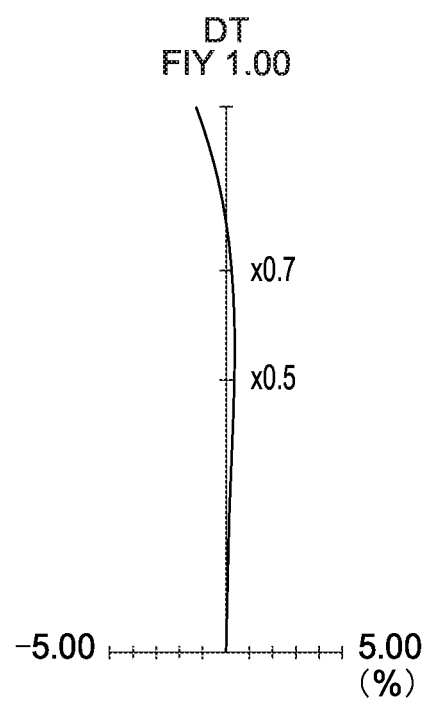

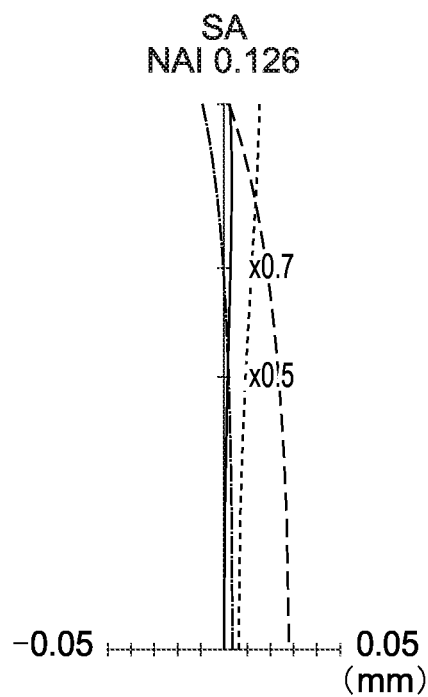
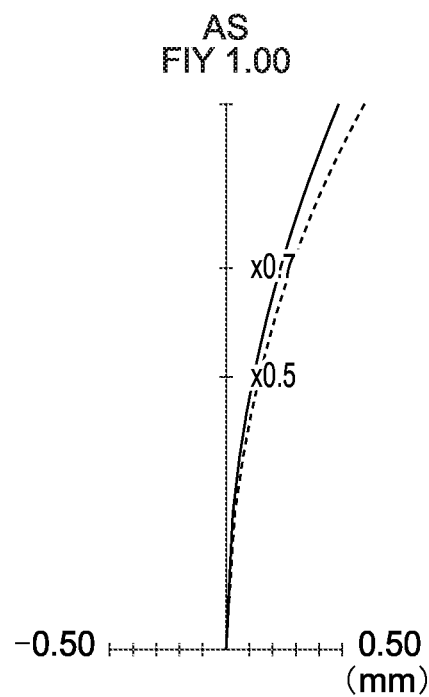
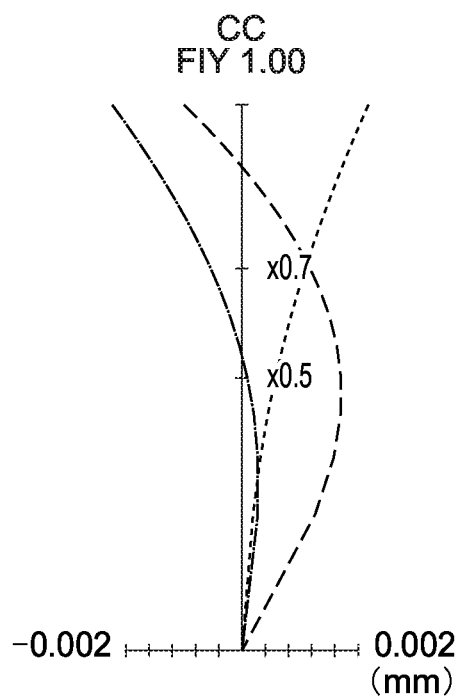
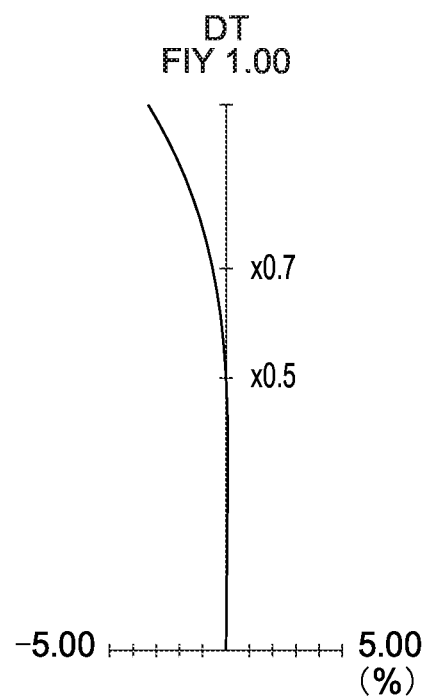

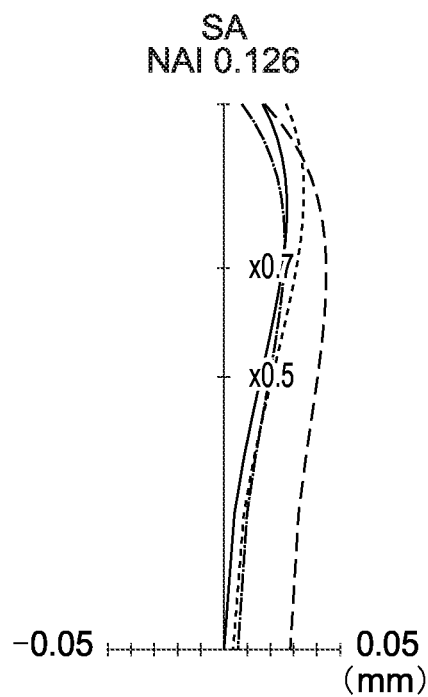
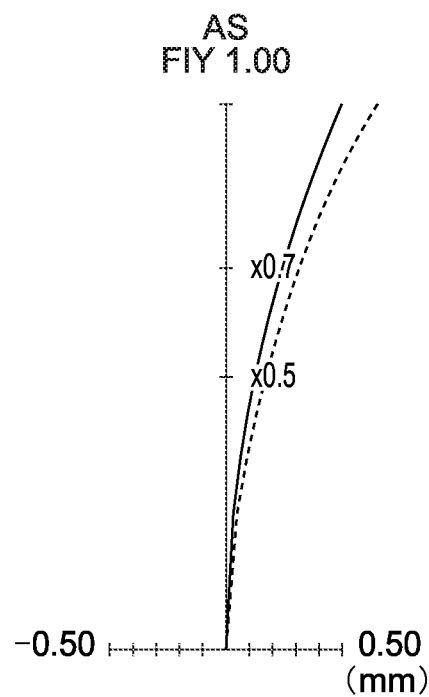
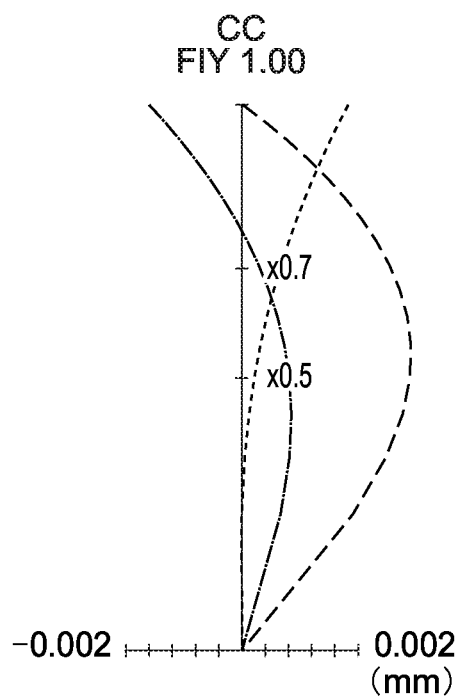
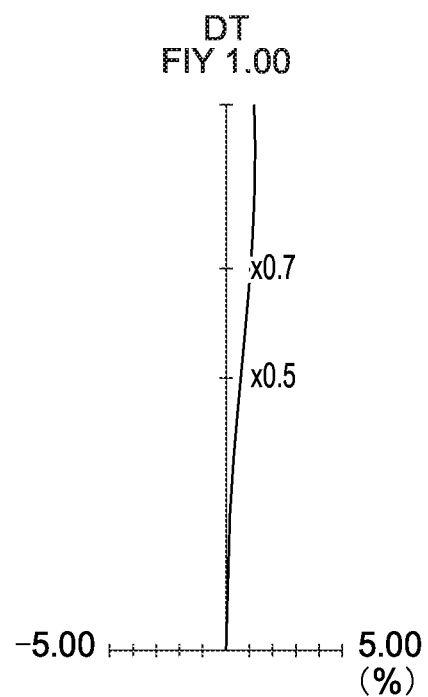

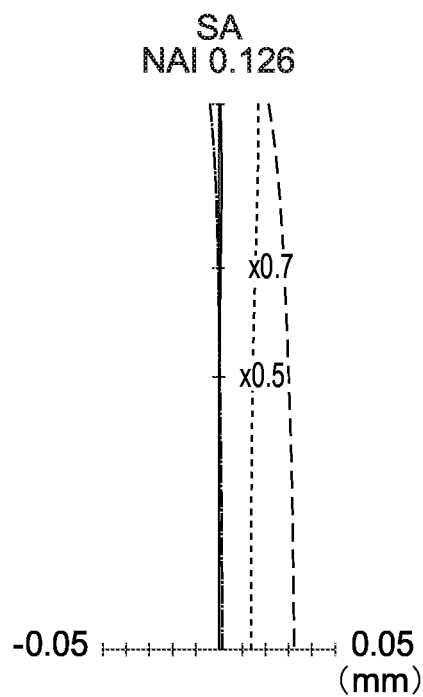
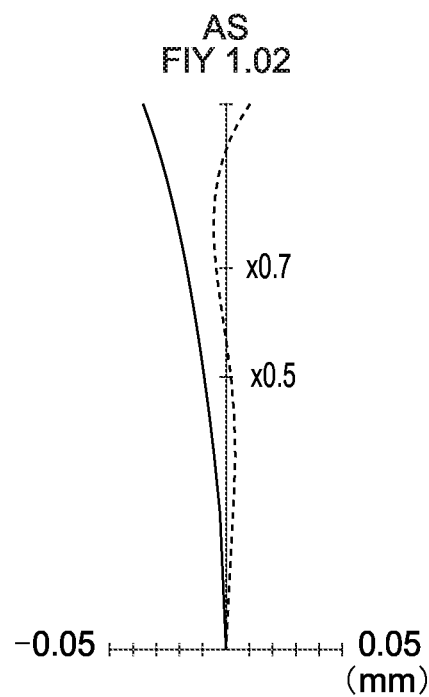
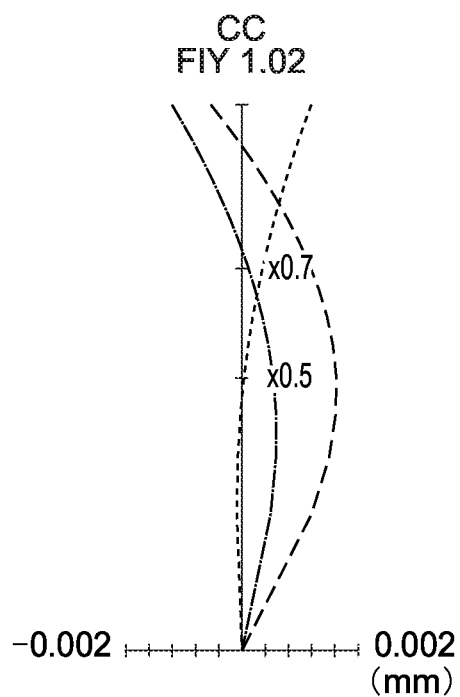
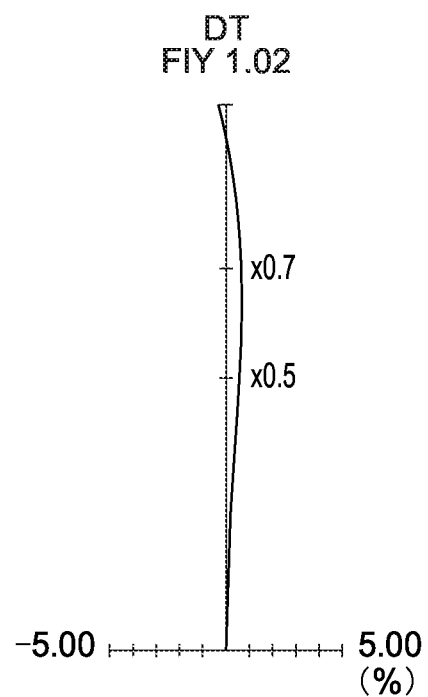

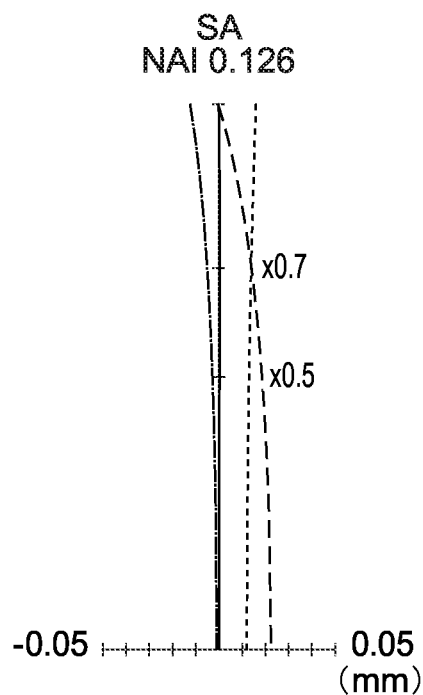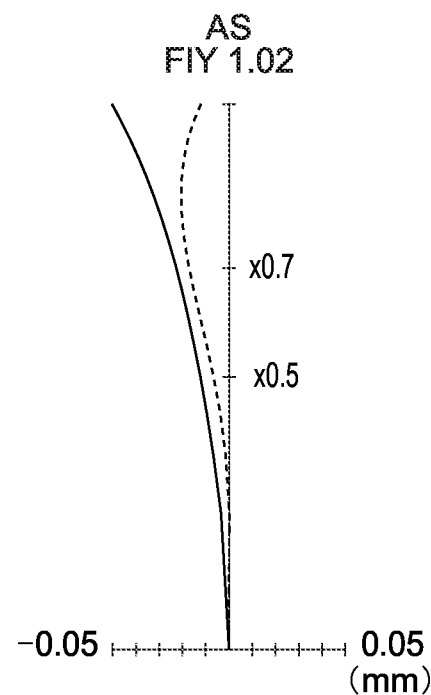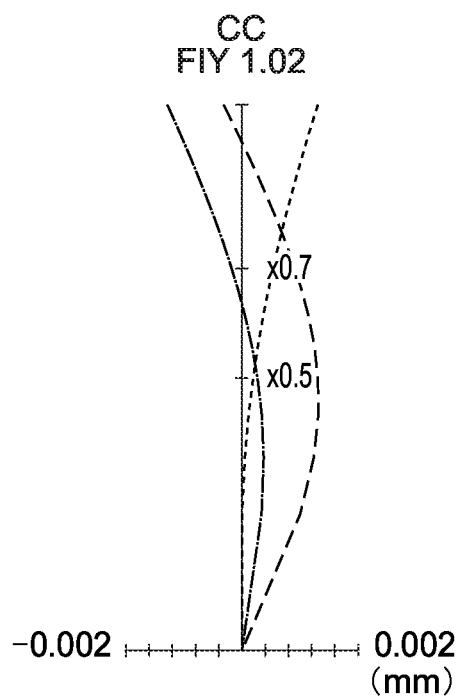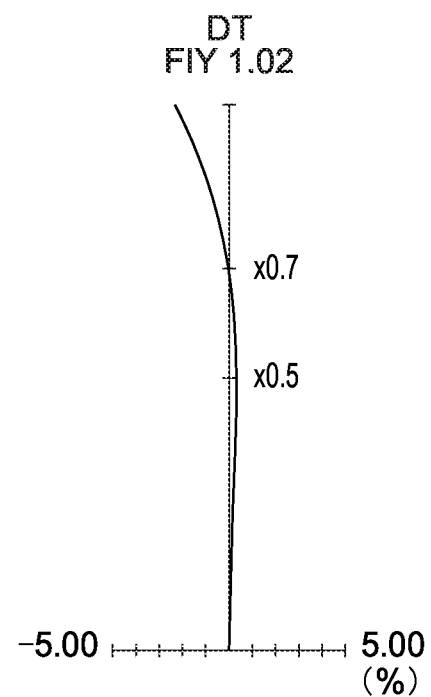

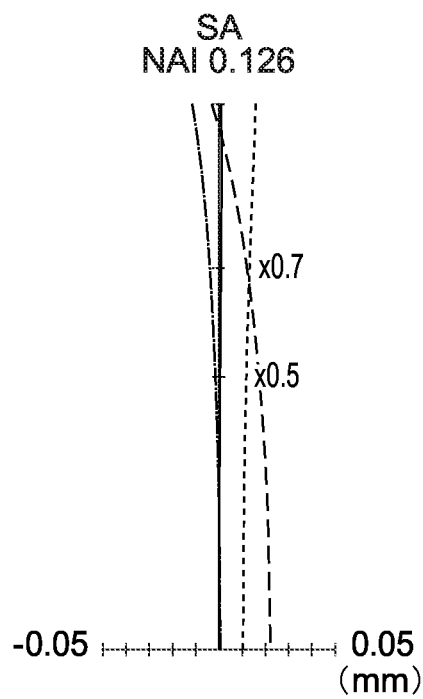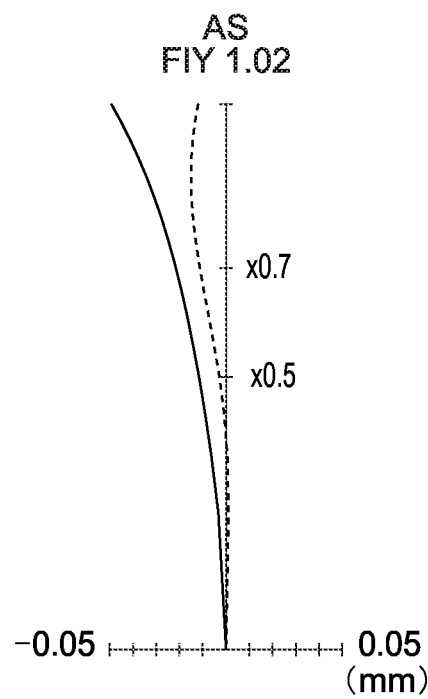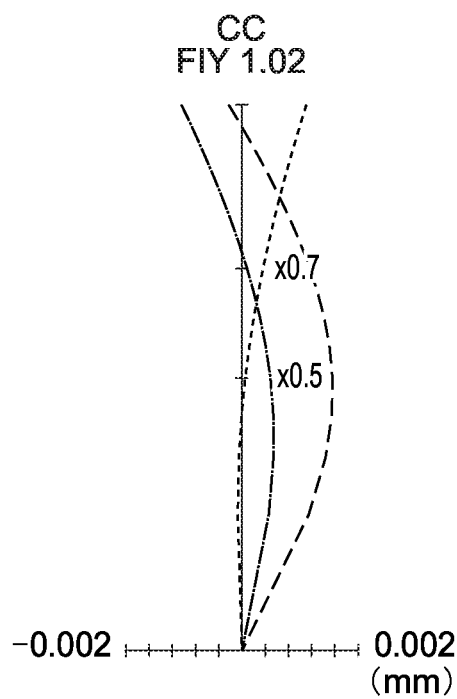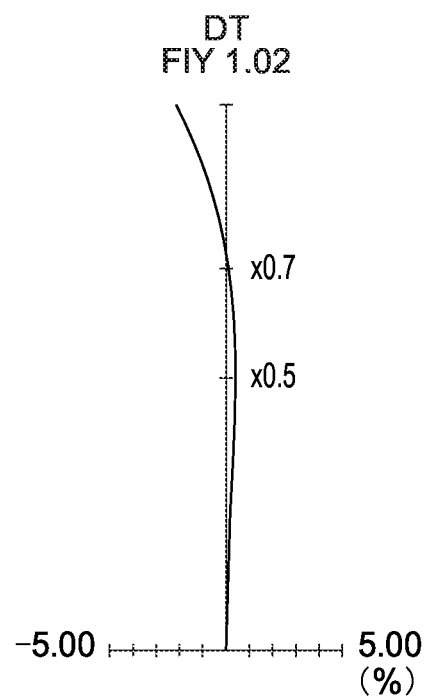

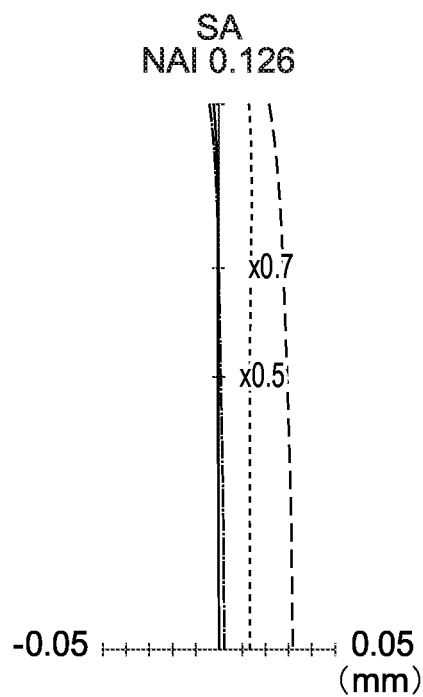
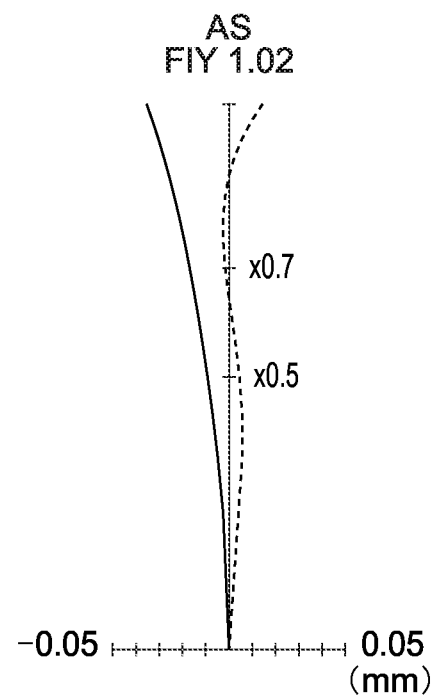
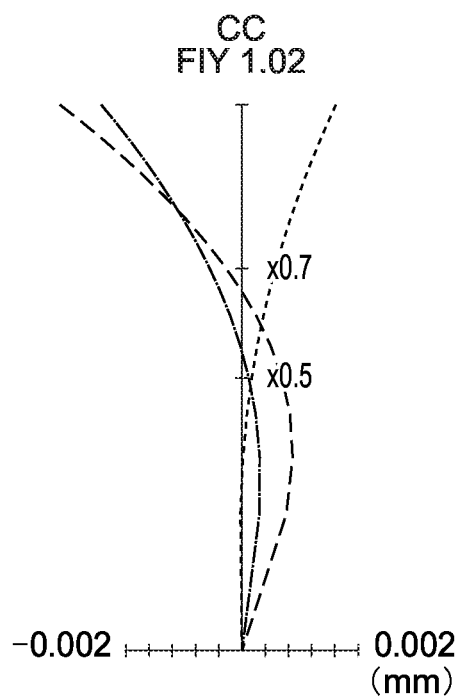
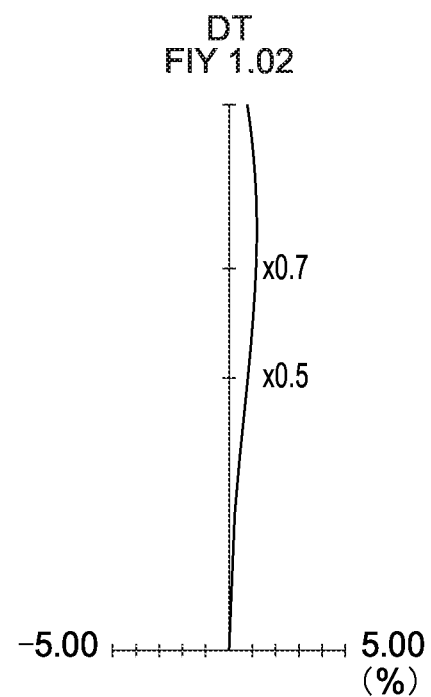

SA
NAI 0.126

AS
FIY 1.02

CC
FIY 1.02

DT
FIY 1.02

SA
NAI 0.126

AS
FIY 1.02

CC
FIY 1.02

DT
FIY 1.02

OBJECTIVE OPTICAL SYSTEM, AND OPTICAL SYSTEM FOR RIGID ENDOSCOPE AND RIGID ENDOSCOPE USING THE SAME

CROSS-REFERENCE TO RELATED APPLICATION

The present application is a continuation application of International Application No. PCT/JP2018/022908 filed on Jun. 15, 2018, the entire contents of which are incorporated herein by reference.

BACKGROUND

Technical Field

The present disclosure relates to an objective optical system, and an optical system for rigid endoscope and a rigid endoscope using the objective optical system.

Description of the Related Art

In recent years, in a diagnosis using a rigid endoscope, an improvement in diagnostic accuracy has been sought. In order to fulfil this requirement, an ability to observe an object (a subject) with a high resolution and an ability to acquire an image of the object with a high image quality have been sought.

Specifically, for instance, acquiring an image by an endoscope system suitable for an HDTV (High-Definition Television) and acquiring an image by an endoscope system suitable for 4K, have been sought.

An endoscope system includes for instance, a rigid endoscope, a TV camera head, a camera control unit, and a display. Requirements for an optical system for making a high-definition in image quality of an image are that an optical system has a large numerical aperture and that a chromatic aberration is corrected favorably.

When a manufacturing error is caused due to processing of a lens or assembling of an optical system, an imaging performance is degraded. One-side blur is an example of the degradation of imaging performance. The one-side blur is caused due to an image plane being inclined with respect to an optical axis. Hereinafter, a state in which the image plane is inclined with respect to the optical axis will be referred to as inclination of image. A requirement for an optical system for making a high-definition in image quality of an image is that the inclination of image tilt is corrected favorably.

An observation of an object and an acquisition of an image of the object are carried out via an optical system for rigid endoscope which is disposed in a rigid endoscope. In the acquisition of the image of the object, a camera head is connected to the optical system for the rigid endoscope. In the camera head, a device such as a CCD (Charge coupled Device) or a CMOS (Complementary Metal Oxide Semiconductor) is used as an image sensor.

The optical system for rigid endoscope includes an objective lens, an eyepiece, and a plurality of relay optical systems. The plurality of relay optical systems is disposed between the objective lens and the eyepiece.

As an optical system for rigid endoscope, an optical system for rigid endoscope described in Japanese Patent Application Laid-open Publication No. Hei 10-115788 and an optical system for rigid endoscope described in Japanese Patent Application Laid-open Publication No. Hei 11-142729 are available.

In Japanese Patent Application Laid-open Publication No. Hei 10-115788, correcting the inclination of image by decentering a lens has been disclosed. In Japanese Patent Laid-open Publication No. Hei 11-142729, an optical system for rigid endoscope having an image quality that can cope with an HDTV camera has been disclosed.

SUMMARY

An objective optical system according to at least some embodiments of the present disclosure includes in order from an object side,
a front unit having a positive refractive power; and
a rear unit, wherein
the front unit includes in order from the object side, a first lens having a negative refractive power, a second lens having a positive refractive power, and a third lens having a positive refractive power,
the rear unit includes one lens or a plurality of lenses, and
the following conditional expression (1) is satisfied:

$$|(FLag-FLaC)/FLad|<0.05 \quad (1)$$

where,
FLad denotes a focal length for a d-line of the front unit,
FLag denotes a focal length for a g-line of the front unit, and
FLaC denotes a focal length for a C-line of the front unit.

Moreover, another objective optical system according to at least some embodiments of the present disclosure includes in order from an object side,
a front unit having a positive refractive power, and
a rear unit, wherein
the front unit includes in order from the object side, a first lens having a negative refractive power, a second lens having a positive refractive power, and a third lens having a positive refractive power,
the rear unit includes one lens or a plurality of lenses, and
the following conditional expression (4) is satisfied:

$$|\{(1-\beta g)\times \gamma g-(1-\beta C)\times \gamma C\}/\{(1-\beta d)\times \gamma d\}|<0.05 \quad (4)$$

where,
βd denotes an imaging magnification for a d-line of the front unit,
βg denotes an imaging magnification for a g-line of the front unit,
βC denotes an imaging magnification for a C-line of the front unit,
γd denotes an imaging magnification for the d-line of the rear unit,
γg denotes an imaging magnification for the g-line of the rear unit, and
γc denotes an imaging magnification for the C-line of the rear unit.

Moreover, an optical system for rigid endoscope according to at least some embodiments of the present disclosure includes
the abovementioned objective optical system,
a relay optical system, and
an eyepiece optical system.

Furthermore, a rigid endoscope according to at least some embodiments of the present disclosure includes
the abovementioned optical system for rigid endoscope, and
an illuminating optical system.

BRIEF DESCRIPTION OF THE DRAWINGS

FIG. 7A, FIG. 7B, FIG. 7C, and FIG. 7D are aberration diagrams of the objective optical system of the example 1;

FIG. 8A, FIG. 8B, FIG. 8C, and FIG. 8D are aberration diagrams of the objective optical system of the example 2;

FIG. 9A, FIG. 9B, FIG. 9C, and FIG. 9D are aberration diagrams of the objective optical system of the example 3;

FIG. 10A, FIG. 10B, FIG. 10C, and FIG. 10D are aberration diagrams of the objective optical system of the example 4;

FIG. 11A, FIG. 11B, FIG. 11C, and FIG. 11D are aberration diagrams of the objective optical system of the example 5;

FIG. 12A, FIG. 12B, FIG. 12C, and FIG. 12D are aberration diagrams of the objective optical system of the example 6;

FIG. 19A, FIG. 19B, FIG. 19C, and FIG. 19D are aberration diagrams of the optical system for rigid endoscope of the example 1;

FIG. 20A, FIG. 20B, FIG. 20C, and FIG. 20D are aberration diagrams of the optical system for rigid endoscope of the example 2;

FIG. 21A, FIG. 21B, FIG. 21C, and FIG. 21D are aberration diagrams of the optical system for rigid endoscope of the example 3;

FIG. 22A, FIG. 22B, FIG. 22C, and FIG. 22D are aberration diagrams of the optical system for rigid endoscope of the example 4;

DETAILED DESCRIPTION

Figure 1:
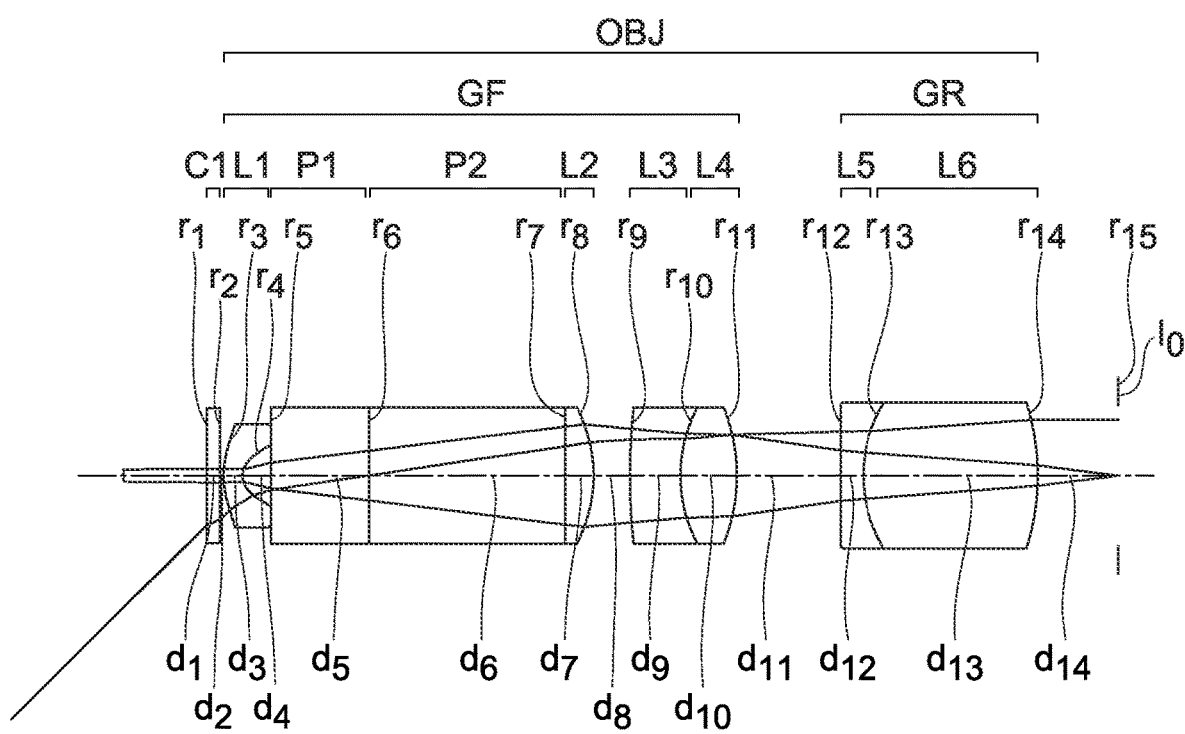
FIG. 1 is a lens cross-sectional view of an objective optical system of an example 1.
Figure 2:
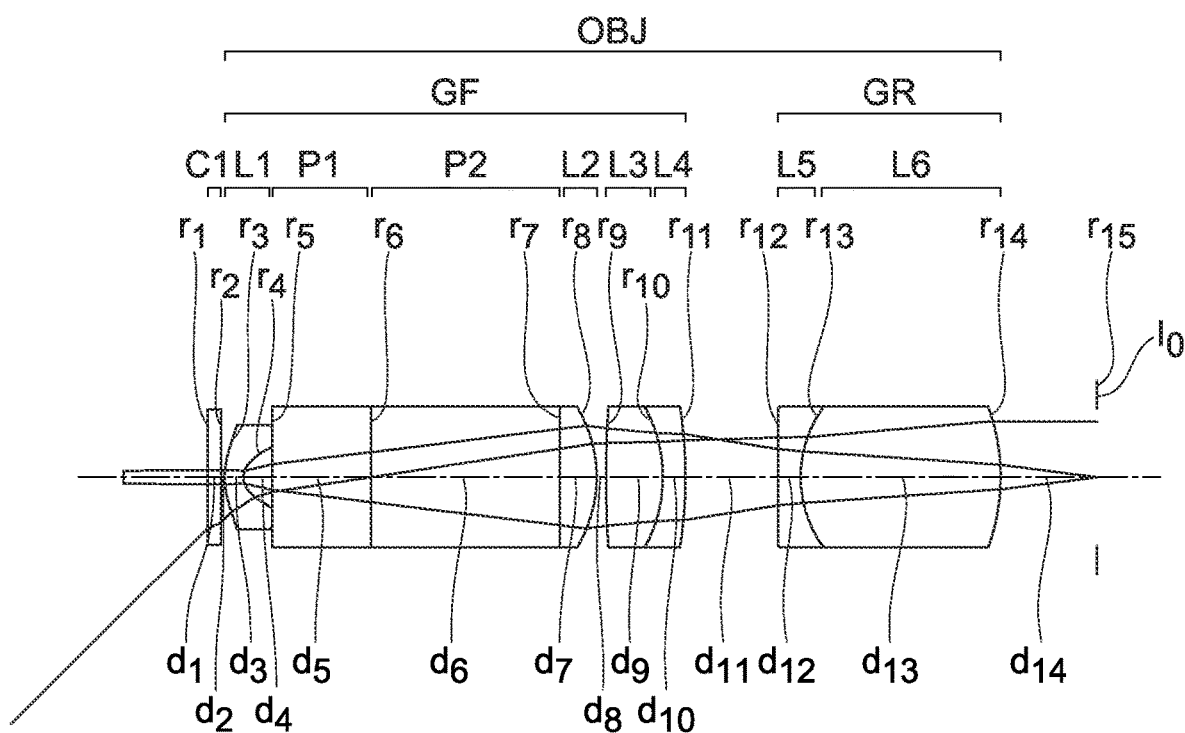
FIG. 2 is a lens cross-sectional view of an objective optical system of an example 2.
Figure 3:
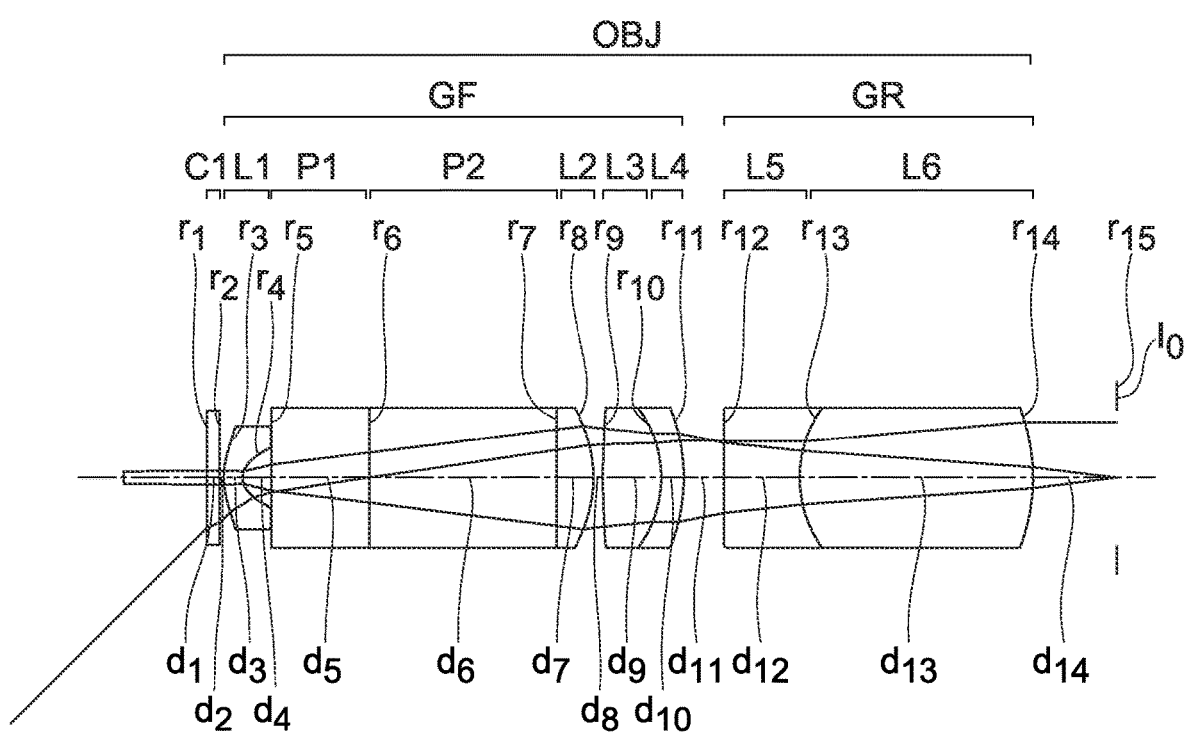
FIG. 3 is a lens cross-sectional view of an objective optical system of an example 3.
Figure 4:
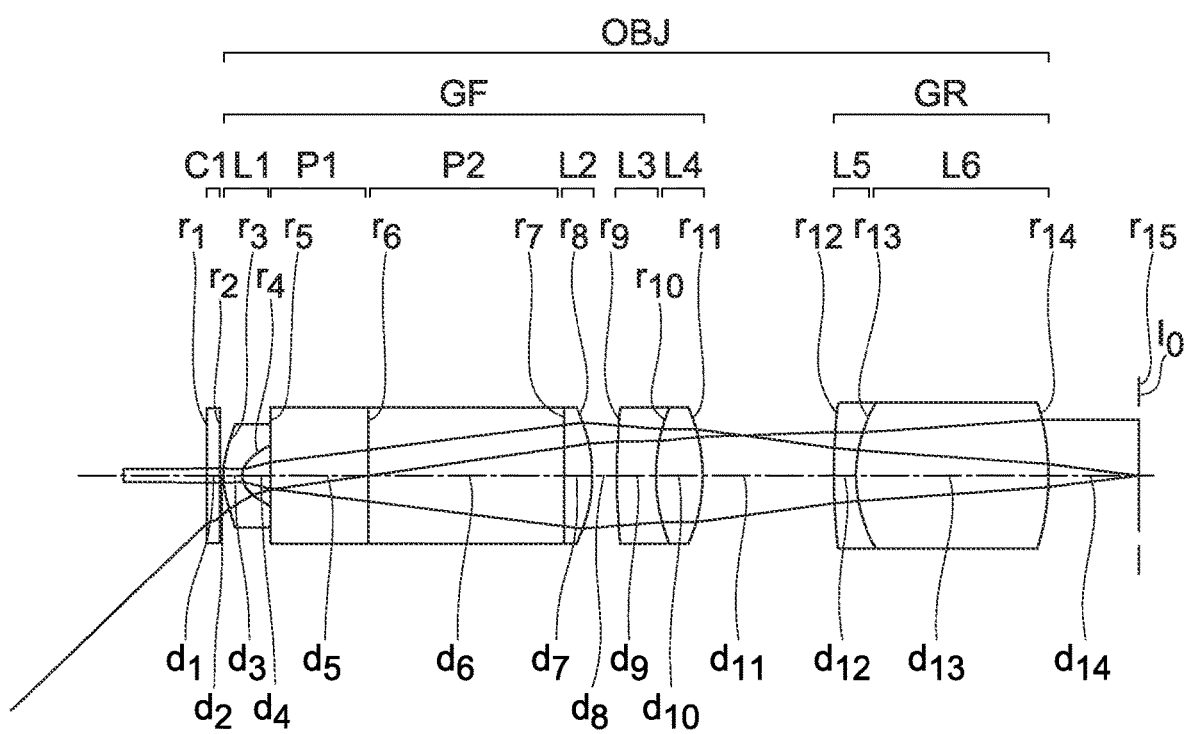
FIG. 4 is a lens cross-sectional view of an objective optical system of an example 4.
Figure 5:
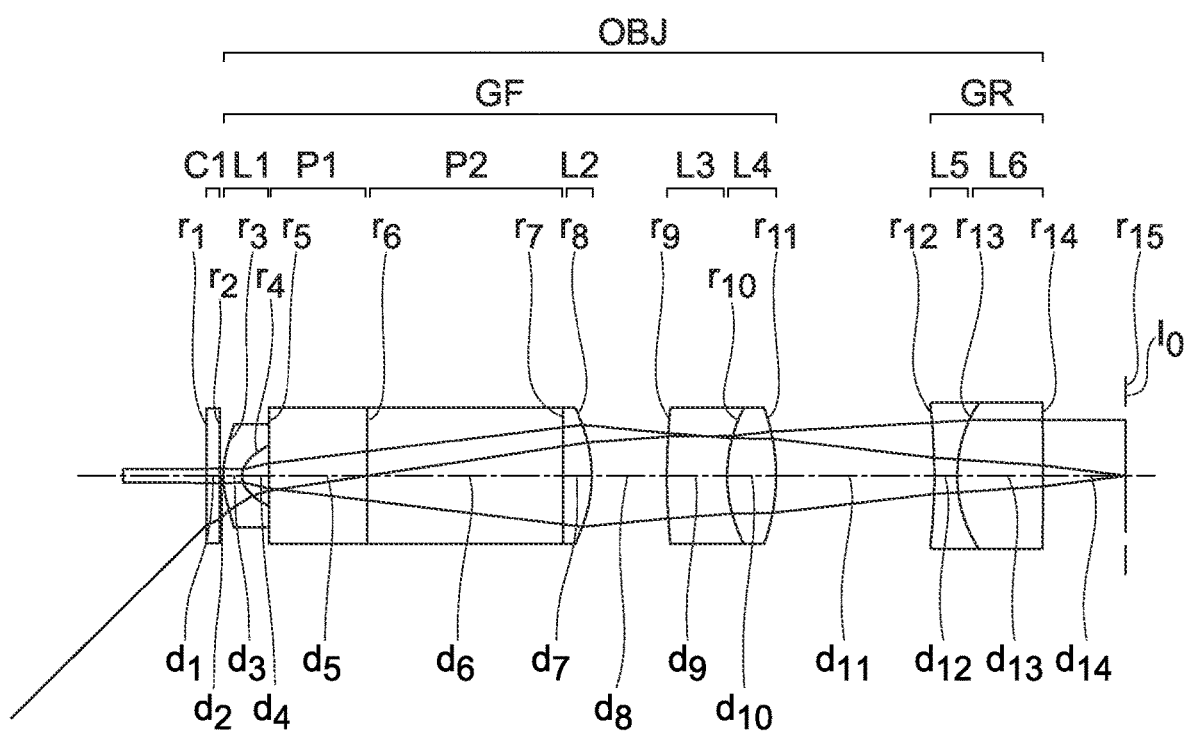
FIG. 5 is a lens cross-sectional view of an objective optical system of an example 5.
Figure 6:
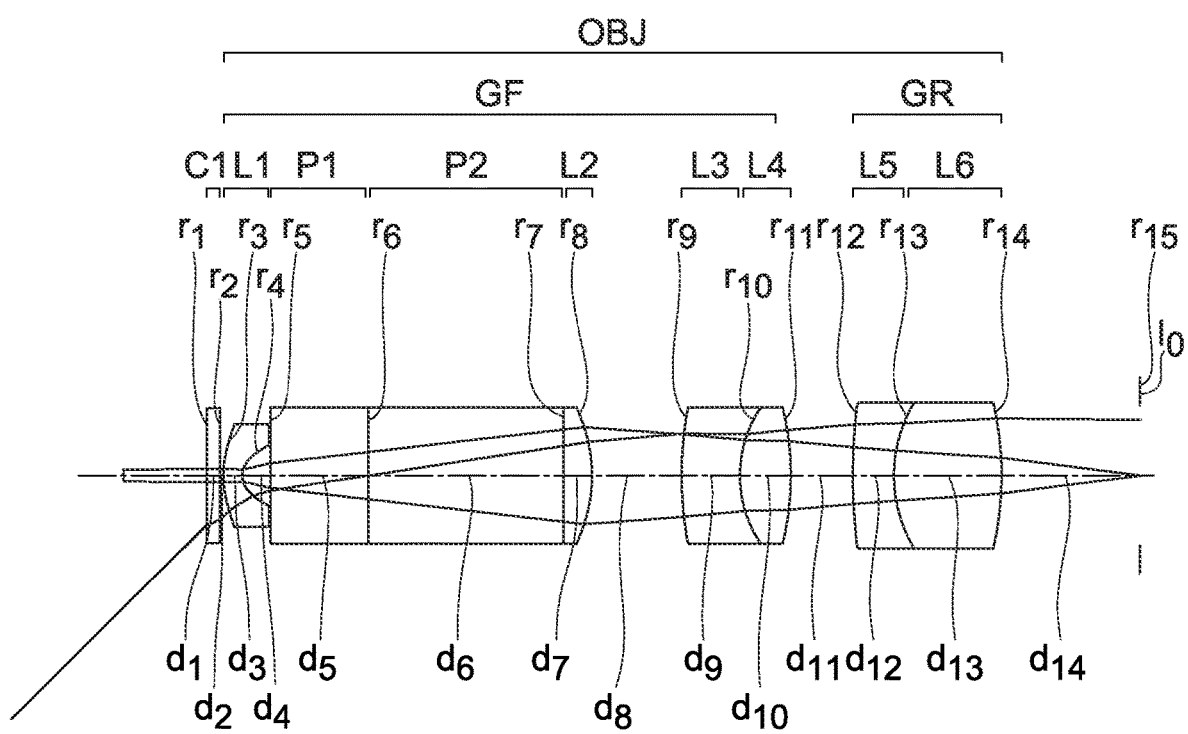
FIG. 6 is a lens cross-sectional view of an objective optical system of an example 6.
Figure 13:
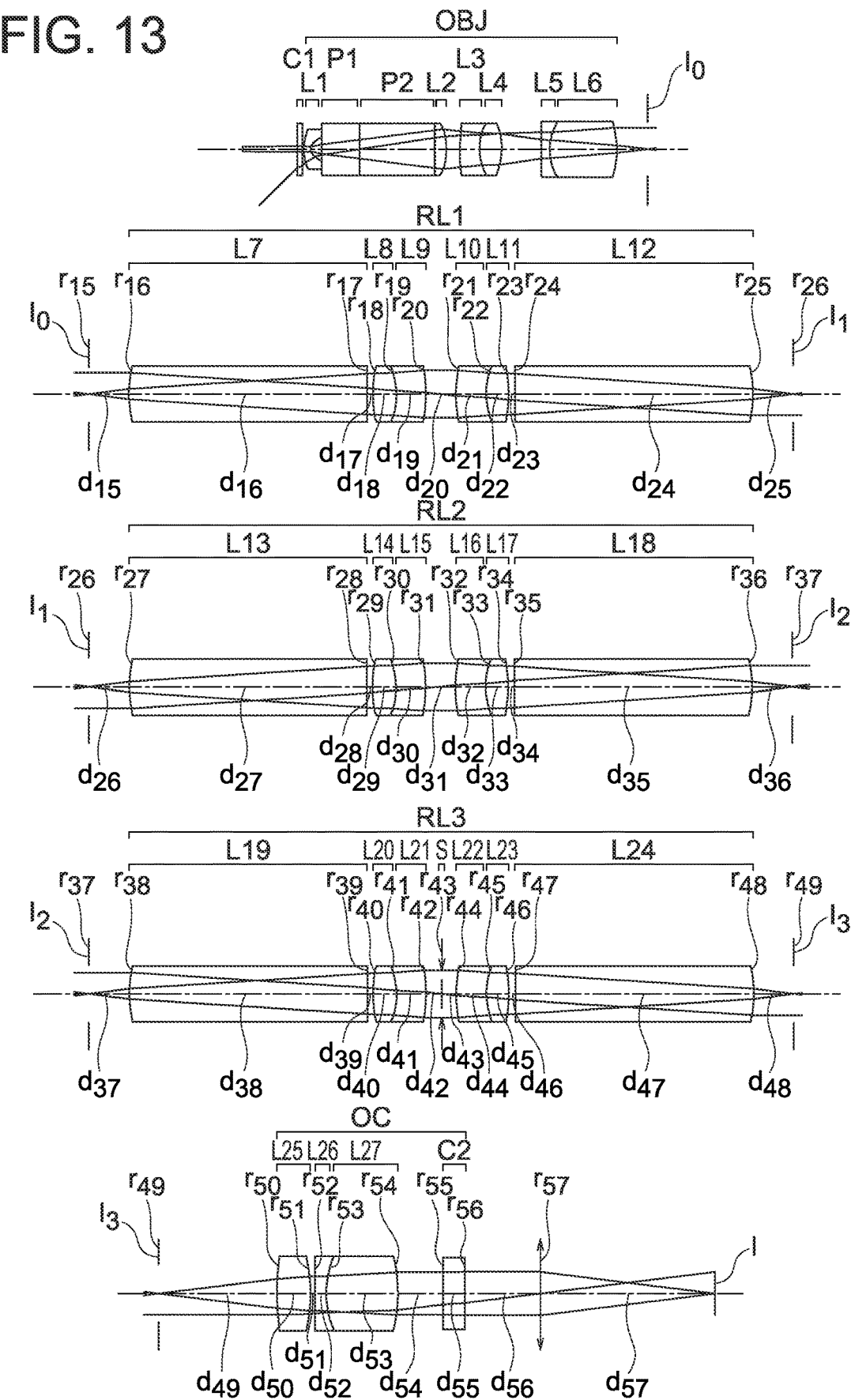
FIG. 13 is a lens cross-sectional view of an optical system for rigid endoscope of an example 1.
Figure 14:
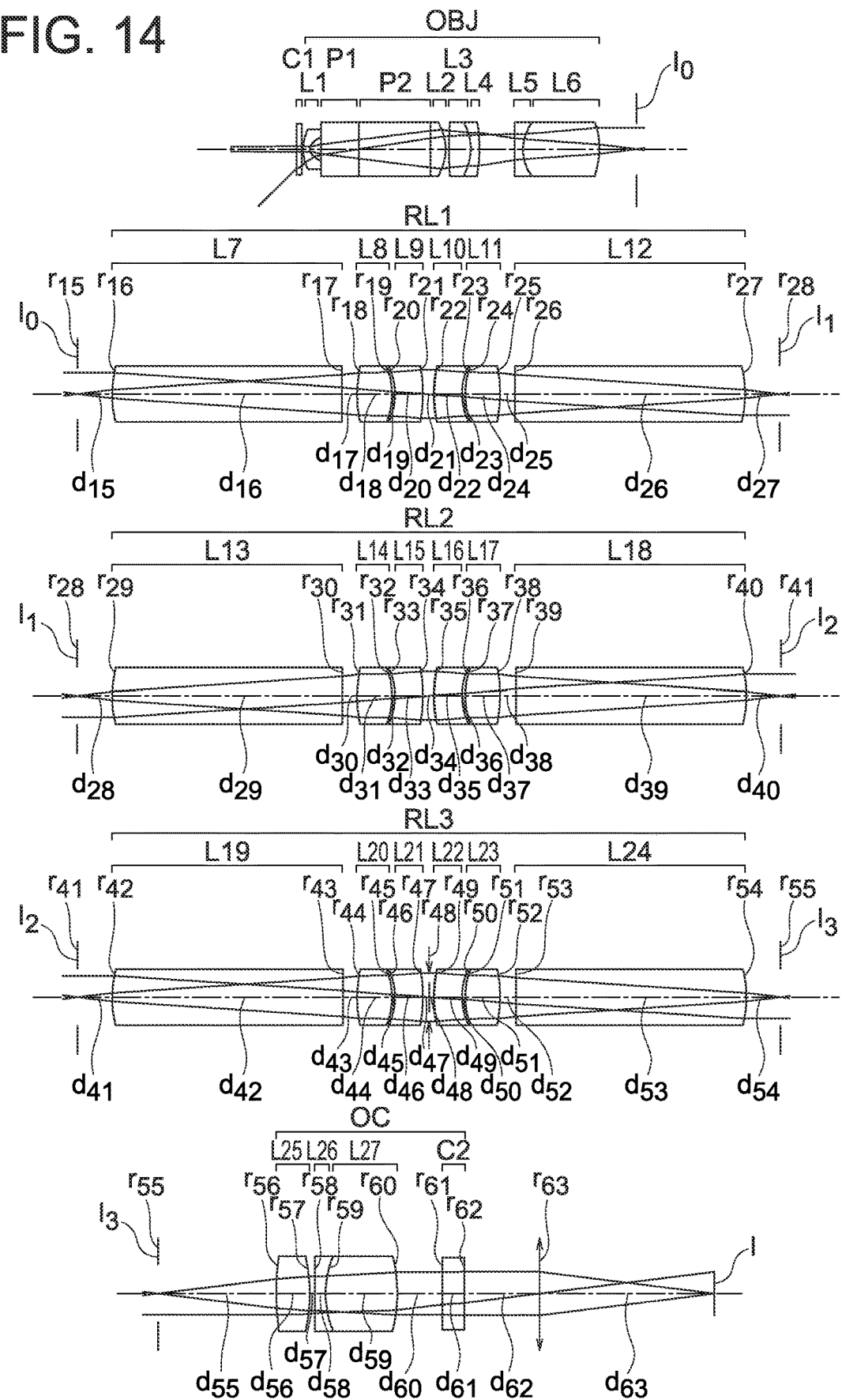
FIG. 14 is a lens cross-sectional view of an optical system for rigid endoscope of an example 2.
Figure 15:
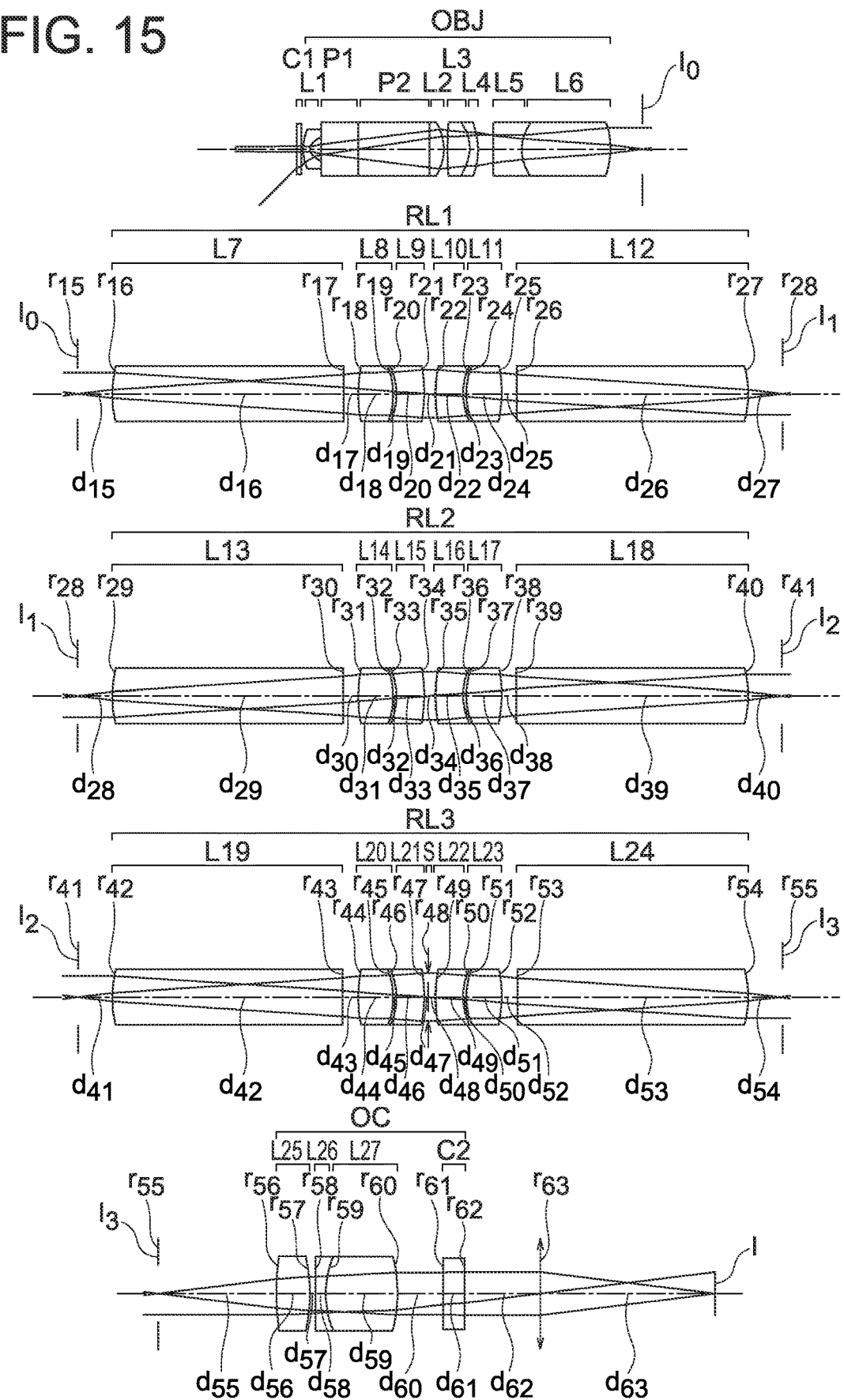
FIG. 15 is a lens cross-sectional view of an optical system for rigid endoscope of an example 3.
Figure 16:
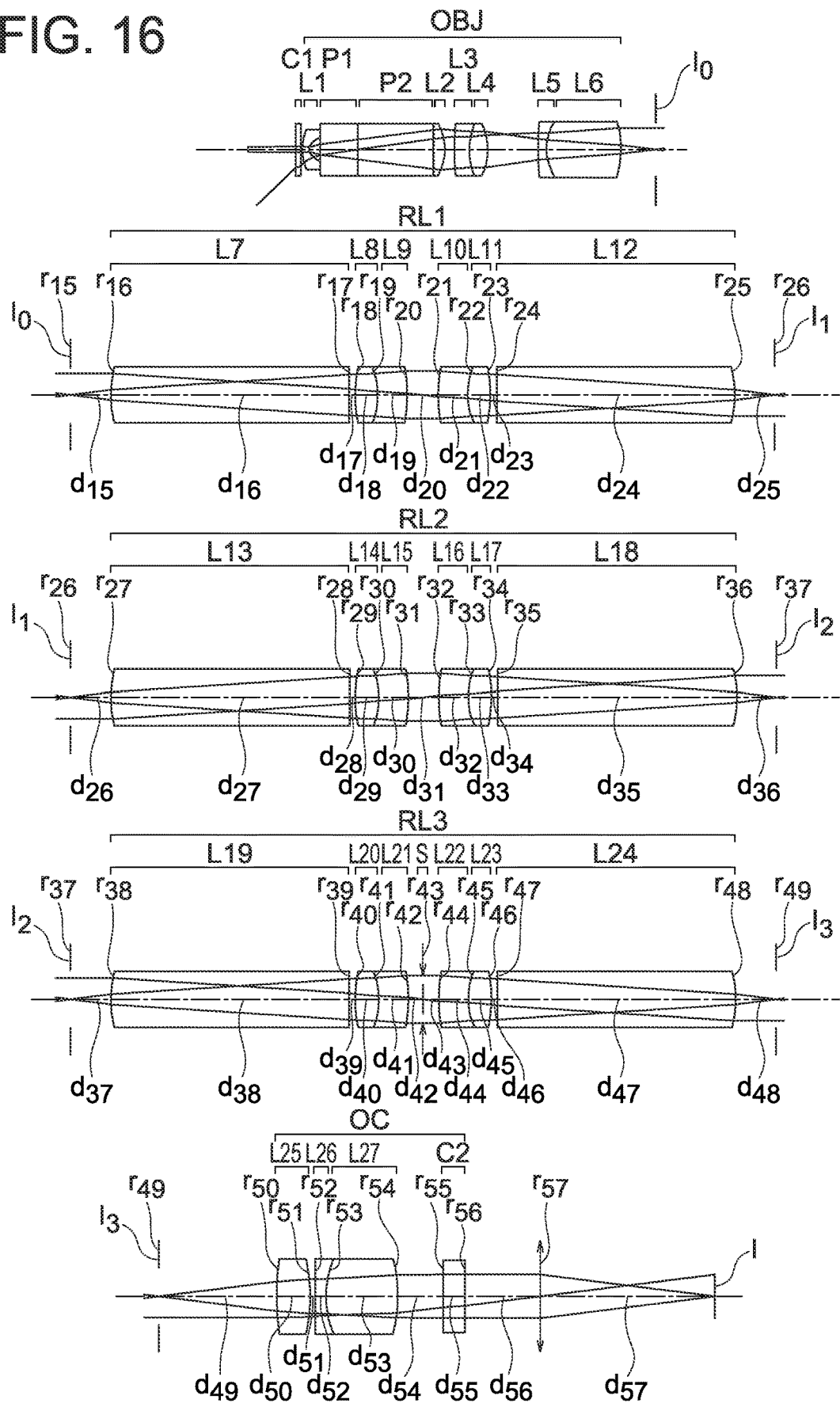
FIG. 16 is a lens cross-sectional view of an optical system for rigid endoscope of an example 4.
Figure 17:
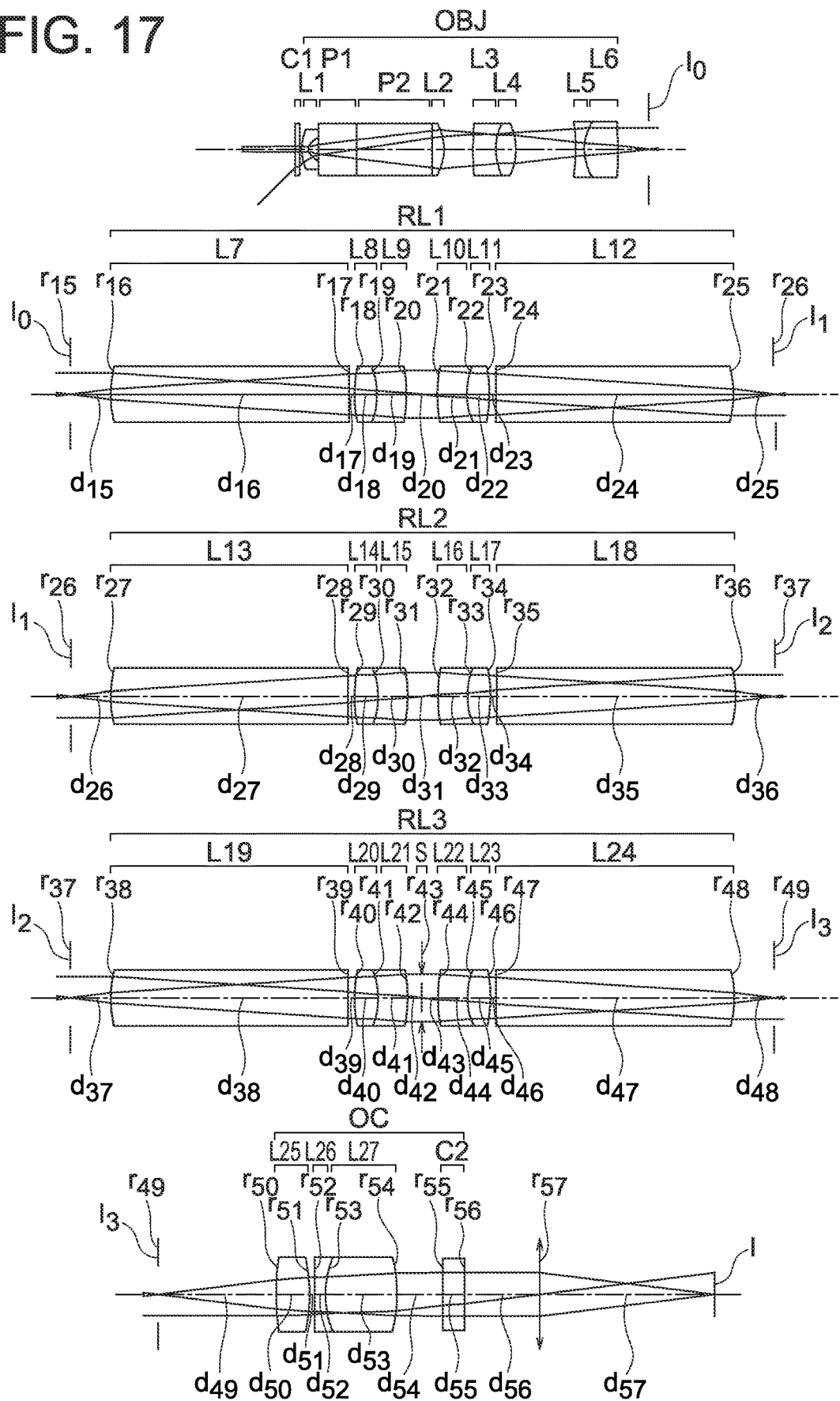
FIG. 17 is a lens cross-sectional view of an optical system for rigid endoscope of an example 5.
Figure 18:
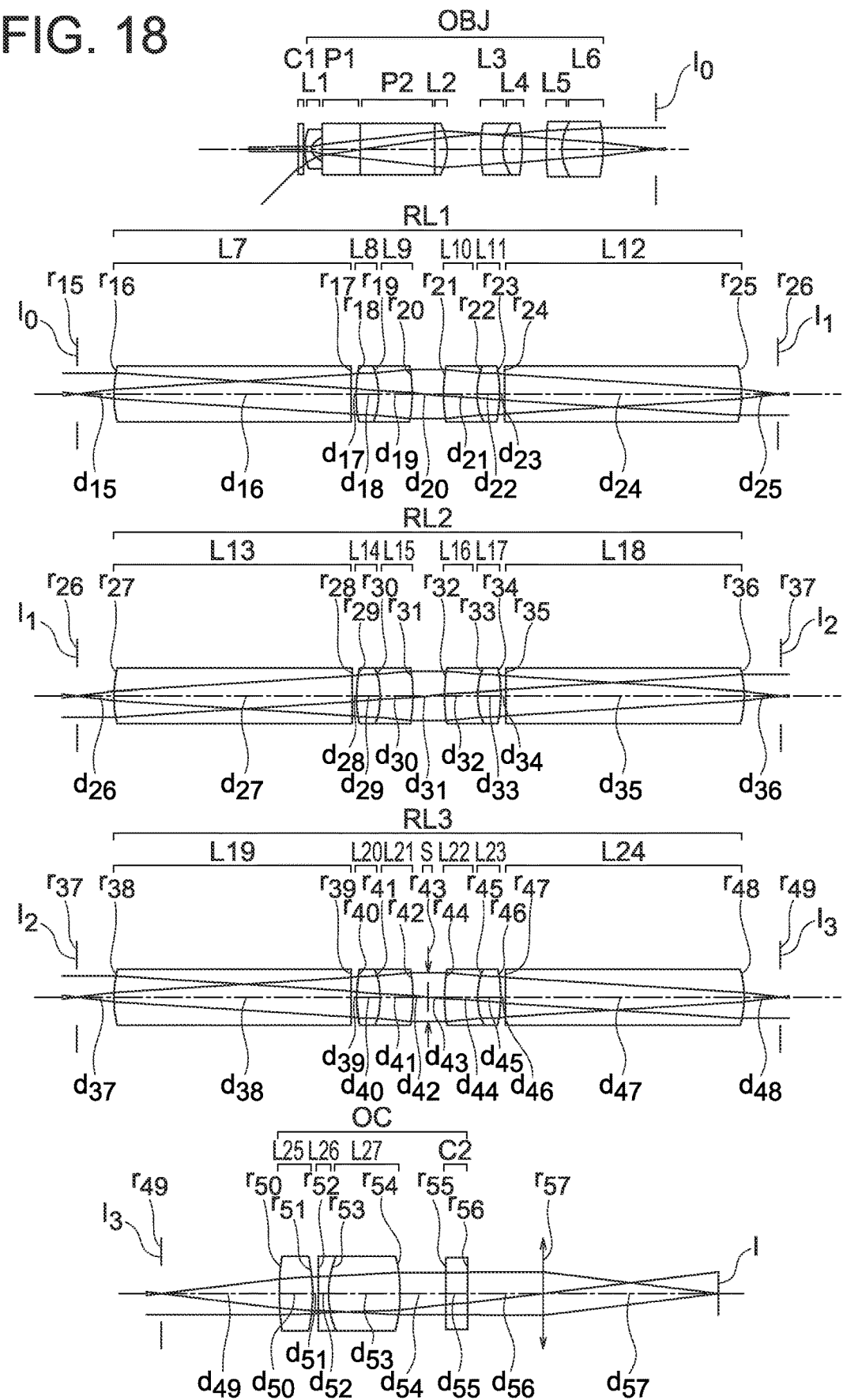
FIG. 18 is a lens cross-sectional view of an optical system for rigid endoscope of an example 6.
Figure 23A:
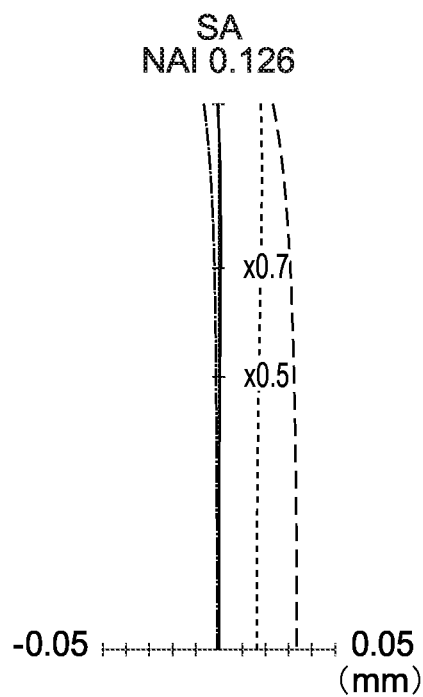
FIG. 23A, FIG. 23B, FIG. 23C, and FIG. 23D are aberration diagrams of the optical system for rigid endoscope of the example 5.
Figure 23B:
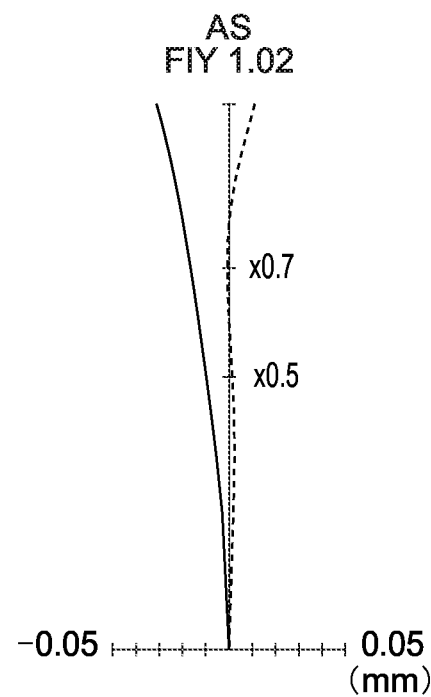
Figure 23C:
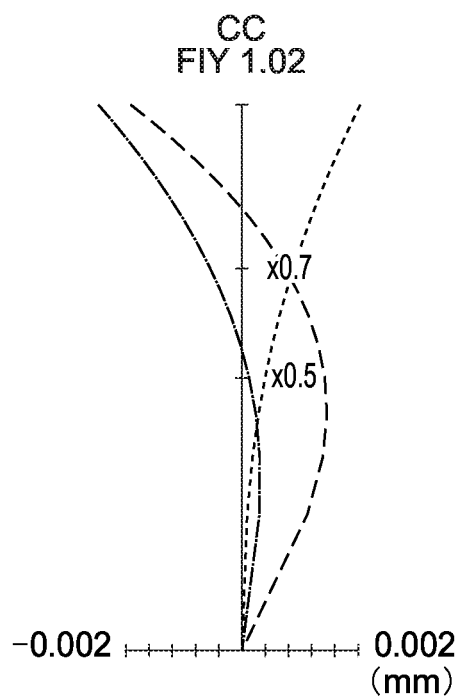
Figure 23D:
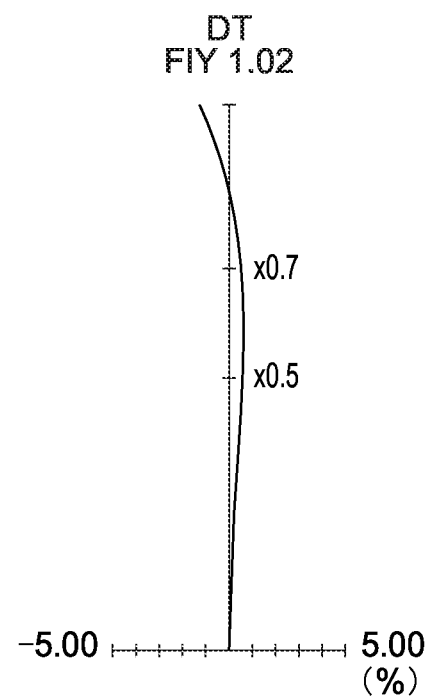
Figure 24A:
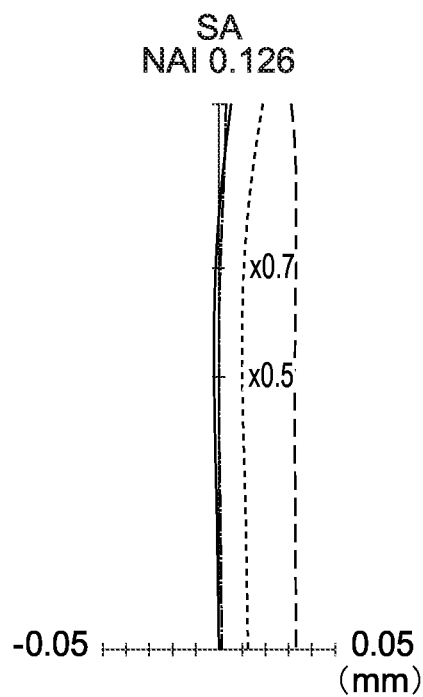
FIG. 24A, FIG. 24B, 24C, and FIG. 24D are aberration diagrams of the optical system for rigid endoscope of the example 6.
Figure 24B:
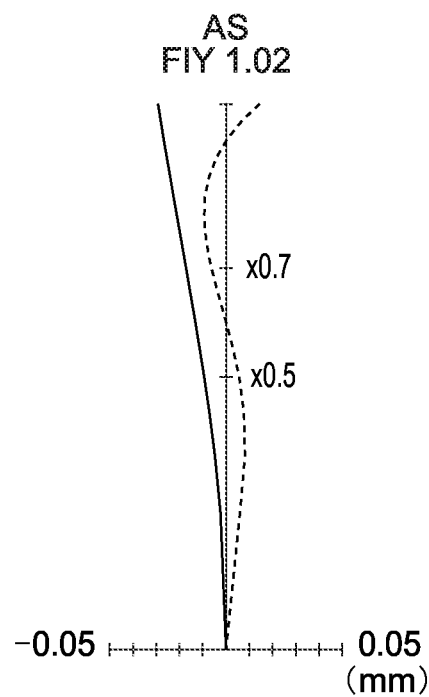
Figure 24C:
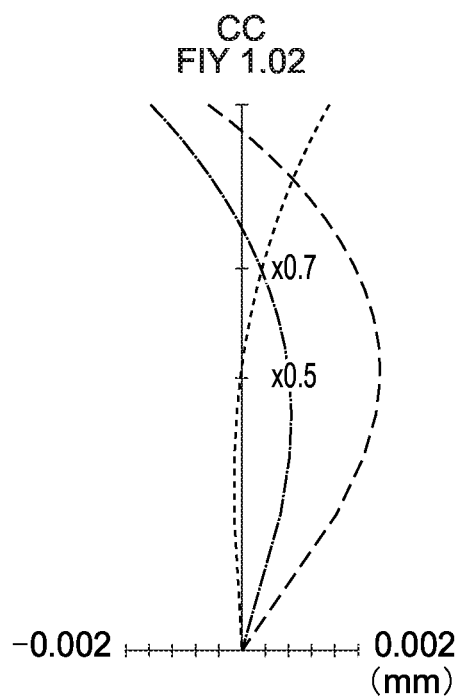
Figure 24D:
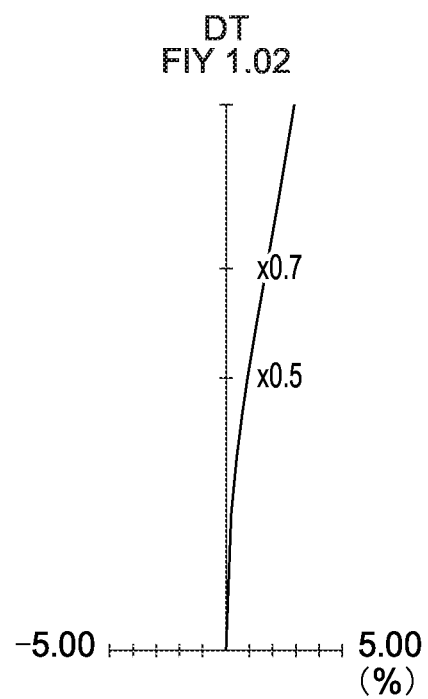

Prior to the explanation of examples, action and effect of embodiments according to certain aspects of the present disclosure will be described below. In the explanation of the action and effect of the embodiments concretely, the explanation will be made by citing concrete examples. However, similar to a case of the examples to be described later, aspects exemplified thereof are only some of the aspects included in the present disclosure, and there exists a large number of variations in these aspects. Consequently, the present disclosure is not restricted to the aspects that will be exemplified.

An objective optical system of a first embodiment and an objective optical system of a second embodiment will be described below. The objective optical system of the first embodiment and the objective optical system of the second embodiment have a common arrangement.

The common arrangement includes in order from an object side, a front unit having a positive refractive power and a rear unit. The front unit included in order from the object side, a first lens having a negative refractive power, a second lens having a positive refractive power, and a third lens having a positive refractive power. The rear unit include one lens or a plurality of lenses.

In an objective optical system, a real image of an object is formed. For this, the objective optical system has a positive refractive power as a whole. On the other hand, for securing a wide field of view, in an objective optical system, light rays with a wide angle of view must be able to form an image. Therefore, in an objective optical system, it is preferable that a lens having a negative refractive power be disposed nearest to an object.

The common arrangement includes in order from the object side, the front unit having a positive refractive power and the rear unit. The front unit includes in order from the object side, the first lens having a negative refractive power, the second lens having a positive refractive power, and the third lens having a positive refractive power.

As just described, in the common arrangement, the first lens having a negative refractive power is disposed nearest to the object. Accordingly, it is possible to secure a wide field of view.

For securing the wide field of view, the first lens is imparted with a large negative refractive power. Consequently, a large aberration occurs in the first lens. In the common arrangement, the second lens having a positive refractive power and the third lens having a positive refractive power are disposed in the front unit. Accordingly, it is possible to correct the aberration occurred in the first lens in the second lens and the third lens. As a result, it is possible to suppress the aberration which occurs in the front unit.

It is possible to let the third lens to be a cemented lens. A cemented lens includes a positive lens and a negative lens. It is preferable that the positive lens be a biconvex lens. It is preferable that the negative lens be a meniscus lens.

As mentioned above, when a manufacturing error is caused due to processing of a lens or assembling of an optical system, the inclination of image occurs. It is possible to correct the inclination of image by decentering a lens. The first lens is imparted with a large negative refractive power. Consequently, even when only the first lens is decentered, although it is possible to correct the inclination of image, a decentration coma and a color shift occur.

In the common arrangement, the aberration which occurs in the front unit is suppressed. Consequently, in the common arrangement, the inclination of image is corrected by decentering the front unit. In the front unit, an occurrence of aberration is suppressed. Accordingly, even when the front unit is decentered, it is possible to suppress an occurrence of the decentration coma and an occurrence of the color shift.

The objective optical system of the first embodiment has the abovementioned common arrangement, and the following conditional expression (1) is satisfied:

$$|(FL_{ag}-FL_{aC})/FL_{ad}|<0.05 \qquad (1)$$

where,

FLad denotes a focal length for a d-line of the front unit,

FLag denotes a focal length for a g-line of the front unit, and

FLaC denotes a focal length for a C-line of the front unit.

In assembling of an optical system, adjustment of the inclination of image is carried out as necessary. In the objective optical system of the first embodiment, the inclination of image is reduced by decentering the front unit. Due to the decentration of the front unit, the color shift occurs. When conditional expression (1) is satisfied, it is possible to correct favorably a chromatic aberration in the front unit. Accordingly, even when the front unit is decentered, the occurrence of the color shift is suppressed.

Conditional expression (1) is a conditional expression in which the focal length of the front unit is regulated for the g-line and the C-line. In a case of exceeding an upper limit value of conditional expression (1), the occurrence of the color shift becomes large.

It is preferable that the following conditional expression (1') be satisfied instead of conditional expression (1).

$$|(FLag-FLaC)/FLad|<0.03 \qquad (1')$$

In the objective optical system of the first embodiment, it is preferable that the following conditional expression (2) be satisfied:

$$0.5<FLob/FLad<2 \qquad (2)$$

where,

FLob denotes a focal length for a d-line of the objective optical system, and

FLad denotes the focal length for the d-line of the front unit.

Conditional expression (2) is a conditional expression in which the focal length of the front unit, or in other words, the refractive power of the front unit is regulated. The focal length of the front unit affects the reduction of the decentration coma. It is possible to said that conditional expression (2) is a conditional expression related to the reduction of the decentration coma.

As mentioned above, in the assembling of the optical system, the adjustment of the inclination of image is carried out as necessary. In the objective optical system of the first embodiment, the inclination of image is reduced by decentering the front unit. Due to the decentration of the front unit, the decentration coma occurs. When conditional expression (2) is satisfied, it is possible to correct favorably a coma in the front unit. Accordingly, even when the front unit is decentered, the occurrence of the decentration coma is suppressed.

In a case of exceeding an upper limit value of conditional expression (2), the positive refractive power in the front unit becomes large. In this case, the decentration coma is susceptible to occur.

In a case of falling below a lower limit value of conditional expression (2), the positive refractive power in the front unit becomes small. Weakening of the positive refractive power in the front unit is advantageous for reduction of the decentration coma. However, in this case, a change in an amount of the inclination of image with respect to a change in a position of the front unit becomes small. Accordingly, it is not possible to correct the inclination of image adequately.

It is more preferable that the following conditional expression (2') be satisfied instead of conditional expression (2).

$$0.7<FLob/FLad<1.7 \qquad (2')$$

In the objective optical system of the first embodiment, it is preferable that the following conditional expression (3) be satisfied:

$$|FLob/R|<0.1 \qquad (3)$$

where,

FLob denotes the focal length for the d-line of the objective optical system, and R denotes a radius of curvature of a surface nearest to an object in the rear unit.

Conditional expression (3) is a conditional expression which regulates the radius of curvature of a surface nearest to the object in the rear unit.

As mentioned above, in the assembling of the optical system, the adjustment of the inclination of image is carried out as necessary. In this adjustment, the inclination of image is reduced by decentering the front unit. By satisfying conditional expression (3), it is possible to decenter the front unit with a high degree of accuracy. As a result, it is possible to correct the inclination of image favorably while suppressing the occurrence of the color shift and the occurrence of the decentration coma.

In a case of exceeding an upper limit value of conditional expression (3), it becomes difficult to decenter the front unit with a high degree of accuracy. Consequently, it becomes difficult to achieve both of, suppressing the occurrence of the color shift and the occurrence of the decentration coma, and favorable correction of the inclination of image.

It is more preferable that the following conditional expression (3') be satisfied instead of conditional expression (3).

$$|FLob/R|<0.05 \qquad (3')$$

The objective optical system of the second embodiment has the abovementioned common arrangement, and the following conditional expression (4) is satisfied:

$$|\{(1-\beta g)\times\gamma g-(1-\beta C)\times\gamma C\}/\{(1-\beta d)\times\gamma d\}|<0.05 \qquad (4)$$

where, $\beta d$ denotes an imaging magnification for a d-line of the front unit, $\beta g$ denotes an imaging magnification for a g-line of the front unit, $\beta C$ denotes an imaging magnification for a C-line of the front unit, $\gamma d$ denotes an imaging magnification for the d-line of the rear unit, $\gamma g$ denotes an imaging magnification for the g-line of the rear unit, and $\gamma c$ denotes an imaging magnification for the C-line of the rear unit.

Conditional expression (4) is a conditional expression in which the imaging magnification of the front unit and the imaging magnification of the rear unit are regulated for the g-line and the C-line. In a case of exceeding an upper limit value of conditional expression (4), the color shift is susceptible to occur.

It is preferable that the following conditional expression (4') be satisfied instead of conditional expression (4).

$$|\{(1-\beta g)\times\gamma g-(1-\beta C)\times\gamma C\}/\{(1-\beta d)\times\gamma d\}|<0.03 \qquad (4')$$

In the objective optical system of the first embodiment and the objective optical system of the second embodiment (hereinafter, referred to as an 'objective optical system of the present embodiment'), it is preferable that the third lens include a single lens or a cemented lens.

Even correcting the inclination of image, it is possible to suppress the occurrence of the color shift.

In the objective optical system of the present embodiment, it is preferable that the third lens be a cemented lens, and the cemented lens include in order from the object side, a negative lens and a positive lens.

Even correcting the inclination of image, it is possible to suppress further the occurrence of the color shift. Moreover, it is possible to correct favorably the chromatic aberration in the front unit.

In the objective optical system of the present embodiment, it is preferable that the front unit consists of a first lens, a second lens, and a third lens.

It is possible to shorten an overall length of the front unit.

An optical system for rigid endoscope of the present embodiment includes the objective optical system of the present embodiment, a relay optical system, and an eyepiece optical system.

According to the optical system for rigid endoscope of the present embodiment, it is possible to realize an objective optical system for rigid endoscope in which a degradation of imaging performance occurred due to the correction of the inclination of image is suppressed even while having a large numerical aperture.

It is possible to capture an image formed by the optical system for rigid endoscope of the present embodiment by an image sensor for example. The objective optical system for rigid endoscope of the present embodiment has a high resolution, and the occurrence of the inclination of image, the occurrence of the color shift, and the occurrence of the decentration coma are suppressed. Accordingly, by capturing the image formed by the optical system for rigid endoscope of the present embodiment, it is possible to acquire a highly defined image.

A rigid endoscope of the present embodiment includes the optical system for rigid embodiment of the present embodiment and an illuminating optical system.

According to the rigid endoscope of the present embodiment, it is possible to observe an optical image in which a degradation of imaging performance occurred due to the correction of the inclination of image is suppressed even while having a large numerical aperture.

It is possible to combine the rigid endoscope of the present embodiment with an image pickup apparatus. In this case, it is possible to capture an image formed by the optical system for rigid endoscope by an image sensor. The optical system for rigid endoscope of the present embodiment has a high resolution, and the occurrence of the inclination of image, the occurrence of the color shift, and the occurrence of the decentration coma are suppressed. Accordingly, by capturing the image formed by the optical system for rigid endoscope of the present embodiment by the image sensor, it is possible to acquire a highly defined image.

Examples of the objective optical system, the optical system for rigid endoscope, and the rigid endoscope will be described below while referring to the accompanying diagram. However, the present disclosure is not restricted to the examples described below.

Examples of the objective optical system will be described below. FIG. 1 to FIG. 6 are lens cross-sectional views of objective optical systems of the examples. In the lens cross-sectional views of the examples, an axial marginal light ray and a principal light ray of the maximum image height are shown. Io denotes an image of an object. As it will be described later, in a case in which an objective optical system is used with a relay optical system, Io becomes a primary image.

Aberration diagrams of each example will be described below.

FIG. 7A, FIG. 8A, FIG. 9A, FIG. 10A, FIG. 11A, and FIG. 12A show a spherical aberration (SA).

FIG. 7B, FIG. 8B, FIG. 9B, FIG. 10B, FIG. 11B, and FIG. 12B show an astigmatism (AS).

FIG. 7C, FIG. 8C, FIG. 9C, FIG. 10C, FIG. 11C, and FIG. 12C show a chromatic aberration of magnification (CC).

FIG. 7D, FIG. 8D, FIG. 9D, FIG. 10D, FIG. 11D, and FIG. 12D show a distortion (DT).

An objective optical system of an example 1 includes in order from an object side, a front unit GF and a rear unit GR. The front unit GF includes a negative meniscus lens L1 having a convex surface directed toward the object side, a planoconvex positive lens L2, a negative meniscus lens L3 having a convex surface directed toward the object side, and a biconvex positive lens L4. The rear unit GR includes a planoconcave negative lens L5 and a biconvex positive lens L6.

The negative meniscus lens L3 and the biconvex positive lens L4 are cemented. The planoconcave negative lens L5 and the biconvex positive lens L6 are cemented.

A plane parallel plate C1 is disposed on the object side of the negative meniscus lens L1. A prism P1 and a prism P2 are disposed on the object side of the planoconvex positive lens L2. The prism P1 is cemented to the prism P2. The prism P2 is cemented to the planoconvex positive lens L2.

An aspherical surface is provided to a total of three surfaces that are both surfaces of the negative meniscus lens L1 and an image-side surface of the planoconvex positive lens L2.

An objective optical system of an example 2 includes in order from an object side, a front unit GF and a rear unit GR. The front unit GF includes a negative meniscus lens L1 having a convex surface directed toward the object side, a planoconvex positive lens L2, a biconvex positive lens L3, and a negative meniscus lens L4 having a convex surface directed toward an image side. The rear unit GR includes a planoconcave negative lens L5 and a biconvex positive lens L6.

The biconvex positive lens L3 and the negative meniscus lens L4 are cemented. The planoconcave negative lens L5 and the biconvex positive lens L6 are cemented.

A plane parallel plate C1 is disposed on the object side of the negative meniscus lens L1. A prism P1 and a prism P2 are disposed on the object side of the planoconvex positive lens L2. The prism P1 is cemented to the prism P2. The prism P2 is cemented to the planoconvex positive lens L2.

An aspherical surface is provided to a total of three surfaces that are both surfaces of the negative meniscus lens L1 and an image-side surface of the planoconvex positive lens L2.

An objective optical system of an example 3 includes in order from an object side, a front unit GF and a rear unit GR. The front unit GF includes a negative meniscus lens L1 having a convex surface directed toward the object side, a planoconvex positive lens L2, a biconvex positive lens L3, and a negative meniscus lens L4 having a convex surface directed toward an image side. The rear unit GR includes a planoconcave negative lens L5 and a biconvex positive lens L6.

The biconvex positive lens L3 and the negative meniscus lens L4 are cemented. The planoconcave negative lens L5 and the biconvex positive lens L6 are cemented.

A plane parallel plate C1 is disposed on the object side of the negative meniscus lens L1. A prism P1 and a prism P2 are disposed on the object side of the planoconvex positive lens L2. The prism P1 is cemented to the prism P2. The prism P2 is cemented to the planoconvex positive lens L2.

An aspherical surface is provided to a total of three surfaces that are both surfaces of the negative meniscus lens L1 and an image-side surface of the planoconvex positive lens L2.

An objective optical system of an example 4 includes in order from an object side, a front unit GF and a rear unit GR. The front unit GF includes a negative meniscus lens L1 having a convex surface directed toward the object side, a planoconvex positive lens L2, a negative meniscus lens L3 having a convex surface directed toward the object side, and a biconvex positive lens L4. The rear unit GR includes a negative meniscus lens L5 having a convex surface directed toward the object side and a biconvex positive lens L6.

The negative meniscus lens L3 and the biconvex positive lens L4 are cemented. The negative meniscus lens L5 and the biconvex positive lens L6 are cemented.

A plane parallel plate C1 is disposed on the object side of the negative meniscus lens L1. A prism P1 and a prism P2 are disposed on the object side of the planoconvex positive lens L2. The prism P1 is cemented to the prism P2. The prism P2 is cemented to the planoconvex positive lens L2.

An aspherical surface is provided to a total of three surfaces that are both surfaces of the negative meniscus lens L1 and an image-side surface of the planoconvex positive lens L2.

An objective optical system of an example 5 includes in order from an object side, a front unit GF and a rear unit GR. The front unit GF includes a negative meniscus lens L1 having a convex surface directed toward the object side, a planoconvex positive lens L2, a negative meniscus lens L3 having a convex surface directed toward the object side, and a biconvex positive lens L4. The rear unit GR includes a biconcave negative lens L5 and a biconvex positive lens L6.

The negative meniscus lens L3 and the biconvex positive lens L4 are cemented. The biconcave negative lens L5 and the biconvex positive lens L6 are cemented.

A plane parallel plate C1 is disposed on the object side of the negative meniscus lens L1. A prism P1 and a prism P2 are disposed on the object side of the planoconvex positive lens L2. The prism P1 is cemented to the prism P2. The prism P2 is cemented to the planoconvex positive lens L2.

An aspherical surface is provided to a total of three surfaces that are both surfaces of the negative meniscus lens L1 and an image-side surface of the planoconvex positive lens L2.

An objective optical system of an example 6 includes in order from an object side, a front unit GF and a rear unit GR. The front unit GF includes a negative meniscus lens L1 having a convex surface directed toward the object side, a planoconvex positive lens L2, a negative meniscus lens L3 having a convex surface directed toward the object side, and a biconvex positive lens L4. The rear unit GR includes a negative meniscus lens L5 having a convex surface directed toward the object side and a biconvex positive lens L6.

The negative meniscus lens L3 and the biconvex positive lens L4 are cemented. The negative meniscus lens L5 and the biconvex positive lens L6 are cemented.

A plane parallel plate C1 is disposed on the object side of the negative meniscus lens L1. A prism P1 and a prism P2 are disposed on the object side of the planoconvex positive lens L2. The prism P1 is cemented to the prism P2. The prism P2 is cemented to the planoconvex positive lens L2.

An aspherical surface is provided to a total of three surfaces that are both surfaces of the negative meniscus lens L1 and an image-side surface of the planoconvex positive lens L2.

Examples of the optical system for rigid endoscope will be described below. FIG. 13 to FIG. 18 are lens cross-sectional views of optical systems for rigid endoscope of the examples. In the lens cross-sectional views of the examples, an axial marginal light ray and a principal light ray of the maximum image height are shown.

Aberration diagrams of the examples will be described below.

FIG. 19A, FIG. 20A, FIG. 21A, FIG. 22A, FIG. 23A, and FIG. 24A show a spherical aberration (SA).

FIG. 19B, FIG. 20B, FIG. 21B, FIG. 22B, FIG. 23B, and FIG. 24B show an astigmatism (AS).

FIG. 19C, FIG. 20C, FIG. 21C, FIG. 22C, FIG. 23C, and FIG. 24C show a chromatic aberration of magnification (CC).

FIG. 19D, FIG. 20D, FIG. 21D, FIG. 22D, FIG. 23D, and FIG. 24D show a distortion (DT).

The optical system for rigid endoscope of each example includes an objective optical system OBJ, an image relay unit, and an eyepiece optical system OC.

In the optical system for rigid endoscope of each example, a primary image Io is formed by the objective optical system OBJ. The primary image Io is relayed by a first relay optical system RL1. Accordingly, a first relay image I1 is formed.

In the optical system for rigid endoscope of each example, the relay unit includes three relay optical systems. The first relay image I1 is relayed by a second relay optical system RL2. Accordingly, a second relay image 12 is formed. The second relay image 12 is relayed by a third relay optical system RL3. Accordingly, a third relay image 13 is formed. It is possible to observe the third relay image 13 by the eyepiece optical system OC.

The optical system for rigid endoscope of each example is an optical system for observing the relay image by the eyepiece optical system OC. Since no real image is formed independently by the optical system for rigid endoscope, it is not possible to show how an aberration occurs. For such reason, by disposing an ideal lens at a pupil position of the eyepiece optical system, a final image I is formed. Each aberration in the aberration diagrams shows an aberration in the final image I. A pupil position in the eyepiece optical system OC is indicated by a two-direction arrow in the lens cross-sectional view.

An imaging magnification by the eyepiece optical system OC and the ideal lens is −1 times. A value of an image height in the aberration diagrams is a value when a height of the primary image Io is 1. The distortion of the eyepiece optical system OC being approximately 2%, the image height in the final image I is 1.02.

An optical system for rigid endoscope of an example 1 includes in order from an object side, an objective optical system OBJ, an image relay unit, and an eyepiece optical system OC. The objective optical system of the example 1 is used for the objective optical system OBJ. Therefore, description of a specific arrangement (for example, shape of lenses, refractive power of lenses, and the number of aspherical surfaces) of the objective optical system is omitted.

The image relay unit includes a first relay optical system RL1, a second relay optical system RL2, and a third relay optical system RL3.

The first relay optical system RL1 includes a planoconvex positive lens L7 of which an object-side surface is a convex surface, a biconvex positive lens L8, a negative meniscus lens L9 having a convex surface directed toward an image side, a negative meniscus lens L10 having a convex surface directed toward the object side, a biconvex positive lens L11, and a planoconvex positive lens L12 of which an image-side surface is a convex surface.

The biconvex positive lens L8 and the negative meniscus lens L9 are cemented. The negative meniscus lens L10 and the biconvex positive lens L11 are cemented.

The second relay optical system RL2 includes a planoconvex positive lens L13 of which an object-side surface is a convex surface, a biconvex positive lens L14, a negative meniscus lens L15 having a convex surface directed toward the image side, a negative meniscus lens L16 having a convex surface directed toward the object side, a biconvex positive lens L17, and a planoconvex positive lens L18 of which an image-side surface is a convex surface.

The biconvex positive lens L14 and the negative meniscus lens L15 are cemented. The negative meniscus lens L16 and the biconvex positive lens L17 are cemented.

The third relay optical system RL3 includes a planoconvex positive lens L19 of which an object-side surface is a convex surface, a biconvex positive lens L20, a negative meniscus lens L21 having a convex surface directed toward the image side, a negative meniscus lens L22 having a convex surface directed toward the object side, a biconvex positive lens L23, and a planoconvex positive lens L24 of which an image-side surface is a convex surface.

The biconvex positive lens L20 and the negative meniscus lens L21 are cemented. The negative meniscus lens L22 and the biconvex positive lens L23 are cemented.

A stop S is disposed between the negative meniscus lens L21 and the negative meniscus lens L22.

The eyepiece optical system OC includes a biconvex positive lens L25, a planoconcave negative lens L26, and a biconvex positive lens L27. The planoconcave negative lens L26 and the biconvex positive lens L27 are cemented. A plane parallel plate C2 is disposed on the image side of the eyepiece optical system OC.

An aspherical surface is provided to a total of six surfaces that are an object-side surface of the biconvex positive lens L8, an image-side surface of the biconvex positive lens L11, an object-side surface of the biconvex positive lens L14, an image-side surface of the biconvex positive lens L17, an object-side surface of the biconvex positive lens L20, and an image-side surface of the biconvex positive lens L23.

In the optical system for rigid endoscope of each example, a plane parallel plate C1 and a plane parallel plate C2 are used as a cover glass. It is possible to use sapphire for the plane parallel plate C1 and the plane parallel plate C2.

Moreover, the plane parallel plate C1 and the plane parallel plate C2 may be imparted with a refractive power. By making such arrangement, it is possible to use the plane parallel plate C1 and the plane parallel plate C2 as auxiliary lenses. For imparting a refractive power to the plane parallel plate C1 and the plane parallel plate C2, at least one optical surface is to be changed from a flat surface to a spherical surface.

An optical system for rigid endoscope of an example 2 includes in order from an object side, an objective optical system OBJ, an image relay unit, and an eyepiece optical system OC. The objective optical system of the example 2 is used for the objective optical system OBJ. Therefore, description of a specific arrangement (for example, shape of lenses, refractive power of lenses, and the number of aspherical surfaces) of the objective optical system OBJ is omitted.

The image relay unit includes a first relay optical system RL1, a second relay optical system RL2, and a third relay optical system RL3.

The first relay optical system RL1 includes a planoconvex positive lens L7 of which an object-side surface is a convex surface, a biconvex positive lens L8, a negative meniscus lens L9 having a convex surface directed toward an image side, a negative meniscus lens L10 having a convex surface directed toward the object side, a biconvex positive lens L11, and a planoconvex positive lens L12 of which an image-side surface is a convex surface.

A resin layer is formed between the biconvex positive lens L8 and the negative meniscus lens L9. A resin layer is formed between the negative meniscus lens L10 and the biconvex positive lens L11. The two resin layers are resin lenses.

The biconvex positive lens L8, the resin lens, and the negative meniscus lens L9 are cemented. The negative meniscus lens L10, the resin lens, and the biconvex positive lens L11 are cemented.

The second relay optical system RL2 includes a planoconvex positive lens L13 of which an object-side surface is a convex surface, a biconvex positive lens L14, a negative meniscus lens L15 having a convex surface directed toward the image side, a negative meniscus lens L16 having a convex surface directed toward the object side, a biconvex positive lens L17, and a planoconvex positive lens L18 of which an image-side surface is a convex surface.

A resin layer is formed between the biconvex positive lens L14 and the negative meniscus lens L15. A resin layer is formed between the negative meniscus lens L16 and the biconvex positive lens L17. The two resin layers are resin lenses.

The biconvex positive lens L14, the resin lens, and the negative meniscus lens L15 are cemented. The negative meniscus lens L16, the resin lens, and the biconvex positive lens L17 are cemented.

The third relay optical system RL3 includes a planoconvex positive lens L19 of which an object-side surface is a convex surface, a biconvex positive lens L20, a negative meniscus lens L21 having a convex surface directed toward the image side, a negative meniscus lens L22 having a convex surface directed toward the object side, a biconvex positive lens L23, and a planoconvex positive lens L24 of which an image-side surface is a convex surface.

A resin layer is formed between the biconvex positive lens L20 and the negative meniscus lens L21. A resin layer is formed between the negative meniscus lens L22 and the biconvex positive lens L23. The two resin layers are resin lenses.

The biconvex positive lens L20, the resin lens, and the negative meniscus lens L21 are cemented. The negative meniscus lens L22, the resin lens, and the biconvex positive lens L23 are cemented.

A stop S is disposed between the negative meniscus lens L21 and the negative meniscus lens L22.

The eyepiece optical system OC includes a biconvex positive lens L25, a planoconcave negative lens L26, and a biconvex positive lens L27. The planoconcave negative lens L26 and the biconvex positive lens L27 are cemented. A plane parallel plate C2 is disposed on the image side of the eyepiece optical system OC.

An aspherical surface is provided to a total of six surfaces that are an object-side surface of the negative meniscus lens L9, an image-side surface of the negative meniscus lens L10, an object-side surface of the negative meniscus lens L15, an image-side surface of the negative meniscus lens L16, an object-side surface of the negative meniscus lens L21, and an image-side surface of the negative meniscus lens L22.

An optical system for rigid endoscope of an example 3 includes in order from an object side, an objective optical system OBJ, an image relay unit, and an eyepiece optical system OC. The objective optical system of the example 3 is used for the objective optical system OBJ. Therefore, description of a specific arrangement (for example, shape of lenses, refractive power of lenses, and the number of aspherical surfaces) of the objective optical system OBJ is omitted.

The image relay unit includes a first relay optical system RL1, a second relay optical system RL2, and a third relay optical system RL3.

The first relay optical system RL1 includes a planoconvex positive lens L7 of which an object-side surface is a convex surface, a biconvex positive lens L8, a negative meniscus lens L9 having a convex surface directed toward an image side, a negative meniscus lens L10 having a convex surface directed toward the object side, a biconvex positive lens L11, and a planoconvex positive lens L12 of which an image-side surface is a convex surface.

A resin layer is formed between the biconvex positive lens L8 and the negative meniscus lens L9. A resin layer is formed between the negative meniscus lens L10 and a biconvex positive lens L11. The two resin layers are resin lenses.

The biconvex positive lens L8, the resin lens, and the negative meniscus lens L9 are cemented. The negative meniscus lens L10, the resin lens, and the biconvex positive lens L11 are cemented.

The second relay optical system RL2 includes a planoconvex positive lens L13 of which an object-side surface is a convex surface, a biconvex positive lens L14, a negative meniscus lens L15 having a convex surface directed toward the image side, a negative meniscus lens L16 having a convex surface directed toward the object side, a biconvex positive lens L17, and a planoconvex positive lens L18 of which an image-side surface is a convex surface.

A resin layer is formed between the biconvex positive lens L14 and the negative meniscus lens L15. A resin layer is formed between the negative meniscus lens L16 and the biconvex positive lens L17. The two resin layers are two lenses.

The biconvex positive lens L14, the resin lens, and the negative meniscus lens L15 are cemented. The negative meniscus lens L16, the resin lens, and the biconvex positive lens L17 are cemented.

The third relay optical system RL3 includes a planoconvex positive lens L19 of which an object-side surface is a convex surface, a biconvex positive lens L20, a negative meniscus lens L21 having a convex surface directed toward the image side, a negative meniscus lens L22 having a convex surface directed toward the object side, a biconvex positive lens L23, and a planoconvex positive lens L24 of which an image-side surface is a convex surface.

A resin layer is formed between the biconvex positive lens L20 and the negative meniscus lens L21. A resin layer is formed between the negative meniscus lens L22 and the biconvex positive lens L23. The two resin layers are resin lenses.

The biconvex positive lens L20, the resin lens, and the negative meniscus lens L21 are cemented. The negative meniscus lens L22, the resin lens, and the biconvex positive lens L23 are cemented.

A stop S is disposed between the negative meniscus lens L21 and the negative meniscus lens L22.

The eyepiece optical system OC includes a biconvex positive lens L25, a planoconcave negative lens L26, and a biconvex positive lens L27. The planoconcave negative lens L26 and the biconvex positive lens L27 are cemented. A plane parallel plate C2 is disposed on the image side of the eyepiece optical system OC.

An aspherical surface is provided to a total of six surfaces that are an object-side surface of the biconvex positive lens L8, an image-side surface of the biconvex positive lens L11, an object-side surface of the biconvex positive lens L14, an image-side surface of the biconvex positive lens L17, an object-side surface of the biconvex positive lens L20, and an image-side surface of the biconvex positive lens L23.

An optical system for rigid endoscope of an example 4 includes in order from an object side, an objective optical system OBJ, an image relay unit, and an eyepiece optical system OC. The objective optical system of the example 4 is used for the objective optical system OBJ. Therefore, description of a specific arrangement (for example, shape of lenses, refractive power of lenses, and the number of aspherical surfaces) of the objective optical system OBJ is omitted.

The image relay unit includes a first relay optical system RL1, a second relay optical system RL2, and a third relay optical system RL3.

The first relay optical system RL1 includes a planoconvex positive lens L7 of which an object-side surface is a convex surface, a biconvex positive lens L8, a negative meniscus lens L9 having a convex surface directed toward an image side, a negative meniscus lens L10 having a convex surface directed toward the object side, a biconvex positive lens L11, and a planoconvex positive lens L12 of which an image-side surface is a convex surface.

The biconvex positive lens L8 and the negative meniscus lens L9 are cemented. The negative meniscus lens L10 and the biconvex positive lens L11 are cemented.

The second relay optical system RL2 includes a planoconvex positive lens L13 of which an object-side surface is a convex surface, a biconvex positive lens L14, a negative meniscus lens L15 having a convex surface directed toward the image side, a negative meniscus lens L16 having a convex surface directed toward the object side, a biconvex positive lens L17, and a planoconvex positive lens L18 of which an image-side surface is a convex surface.

The biconvex positive lens L14 and the negative meniscus lens L15 are cemented. The negative meniscus lens L16 and the biconvex positive lens L17 are cemented.

The third relay optical system RL3 includes a planoconvex positive lens L19 of which an object-side surface is a convex surface, a biconvex positive lens L20, a negative meniscus lens L21 having a convex surface directed toward the image side, a negative meniscus lens L22 having a convex surface directed toward the object side, a biconvex positive lens L23, and a planoconvex positive lens L24 of which an image-side surface is a convex surface.

The biconvex positive lens L20 and the negative meniscus lens L21 are cemented. The negative meniscus lens L22 and the biconvex positive lens L23 are cemented.

A stop S is disposed between the negative meniscus lens L21 and the negative meniscus lens L22.

The eyepiece optical system OC includes a biconvex positive lens L25, a planoconcave negative lens L26, and a biconvex positive lens L27. The planoconcave negative lens L26 and the biconvex positive lens L27 are cemented. A plane parallel plate C2 is disposed on the image side of the eyepiece optical system OC.

An aspherical surface is provided to a total of six surfaces that are an object-side surface of the biconvex positive lens L8, an image-side surface of the biconvex positive lens L11, an object-side surface of the biconvex positive lens L14, an image-side surface of the biconvex positive lens L17, an object-side surface of the biconvex positive lens L20, and an image-side surface of the biconvex positive lens L23.

An optical system for rigid endoscope of an example 5 includes in order from an object side, an objective optical system OBJ, an image relay unit, and an eyepiece optical system OC. The objective optical system of the example 5 is used for the objective optical system OBJ. Therefore, description of a specific arrangement (for example, shape of lenses, refractive power of lenses, and the number of aspherical surfaces) of the objective optical system OBJ is omitted.

The image relay unit includes a first relay optical system RL1, a second relay optical system RL2, and a third relay optical system RL3.

The first relay optical system RL1 includes a planoconvex positive lens L7 of which an object-side surface is a convex surface, a biconvex positive lens L8, a negative meniscus lens L9 having a convex surface directed toward an image side, a negative meniscus lens L10 having a convex surface directed toward the object side, a biconvex positive lens L11, and a planoconvex positive lens L12 of which an image-side surface is a convex surface.

The biconvex positive lens L8 and the negative meniscus lens L9 are cemented. The negative meniscus lens L10 and the biconvex positive lens L11 are cemented.

The second relay optical system RL2 includes a plano-convex positive lens L13 of which an object-side surface is a convex surface, a biconvex positive lens L14, a negative meniscus lens L15 having a convex surface directed toward the image side, a negative meniscus lens L16 having a convex surface directed toward the object side, a biconvex positive lens L17 and a planoconvex positive lens L18 of which an image-side surface is a convex surface.

The biconvex positive lens L14 and the negative meniscus lens L15 are cemented. The negative meniscus lens L16 and the biconvex positive lens L17 are cemented.

The third relay optical system RL3 includes a planocon-vex positive lens L19 of which an object-side surface is a convex surface, a biconvex positive lens L20, a negative meniscus lens L21 having a convex surface directed toward the image side, a negative meniscus lens L22 having a convex surface directed toward the object side, a biconvex positive lens L23, and a planoconvex positive lens L24 of which an image-side surface is a convex surface.

The biconvex positive lens L20 and the negative meniscus lens L21 are cemented. The negative meniscus lens L22 and the biconvex positive lens L23 are cemented.

A stop S is disposed between the negative meniscus lens L21 and the negative meniscus lens L22.

The eyepiece optical system OC includes a biconvex positive lens L25, a planoconcave negative lens L26, and a biconvex positive lens L27. The planoconcave negative lens L26 and the biconvex positive lens L27 are cemented. A plane parallel plate C2 is disposed on the image side of the eyepiece optical system OC.

An aspherical surface is provided to a total of six surfaces that are an object-side surface of the biconvex positive lens L8, an image-side surface of the biconvex positive lens L11, an object-side surface of the biconvex positive lens L14, an image-side surface of the biconvex positive lens L17, an object-side surface of the biconvex positive lens L20, and an image-side surface of the biconvex positive lens L23.

An optical system for rigid endoscope of an example 6 includes in order from an object side, an objective optical system OBJ, an image relay unit, and an eyepiece optical system OC. The objective optical system of the example 6 is used for the objective optical system OBJ. Therefore, description of a specific arrangement (for example, shape of lenses, refractive power of lenses, and the number of aspherical surfaces) of the objective optical system OBJ is omitted.

The image relay unit includes a first relay optical system RL1, a second relay optical system RL2, and a third relay optical system RL3.

The first relay optical system RL1 includes a planoconvex positive lens L7 of which an object-side surface is a convex surface, a biconvex positive lens L8, a negative meniscus lens L9 having a convex surface directed toward an image side, a negative meniscus lens L10 having a convex surface directed toward the object side, a biconvex positive lens L11, and a planoconvex positive lens L12 of which an image-side surface is a convex surface.

The biconvex positive lens L8 and the negative meniscus lens L9 are cemented. The negative meniscus lens L10 and the biconvex positive lens L11 are cemented.

The second relay optical system RL2 includes a plano-convex positive lens L13 of which an object-side surface is a convex surface, a biconvex positive lens L14, a negative meniscus lens L15 having a convex surface directed toward the image side, a negative meniscus lens L16 having a convex surface directed toward the object side, a biconvex positive lens L17, and a planoconvex positive lens L18 of which an image-side surface is a convex surface.

The biconvex positive lens L14 and the negative meniscus lens L15 are cemented. The negative meniscus lens L16 and the biconvex positive lens L17 are cemented.

The third relay optical system RL3 includes a planocon-vex positive lens L19 of which an object-side surface is a convex surface, a biconvex positive lens L20, a negative meniscus lens L21 having a convex surfaced directed toward the image side, a negative meniscus lens L22 having a convex surface directed toward the object side, a biconvex positive lens L23, and a planoconvex positive lens L24 of which an image-side surface is a convex surface.

The biconvex positive lens L20 and the negative meniscus lens L21 are cemented. The negative meniscus lens L22 and the biconvex positive lens L23 are cemented.

A stop S is disposed between the negative meniscus lens L21 and the negative meniscus lens L22.

An eyepiece optical system OC includes a biconvex positive lens L25, a planoconcave negative lens L26, and a biconvex positive lens L27. The planoconcave negative lens L26 and the biconvex positive lens L27 are cemented. A plane parallel plate C2 is disposed on the image side of the eyepiece optical system OC.

An aspherical surface is not used.

Numerical data of each example described above is shown below. In Surface data, r denotes radius of curvature of each lens surface, d denotes a distance between respective lens surfaces, nd denotes a refractive index of each lens for d-line, vd denotes an Abbe number for each lens, * denotes an aspherical surface, and ER denotes an effective diameter.

In Various data, OB denotes an object distance, FOV denotes an angle of view (2ω: unit is °), NAI denotes a numerical aperture of an image side of an objective lens, IH denotes the maximum image height of the primary image Io, and IH total denotes the maximum image height of the final image I.

In Surface data and Glass material data, a name of glass material is mentioned specifically in a column of GLA. However, C1, C2, and Resin A are not specific names of glass material. A glass material for which a specific name is mentioned is a glass material manufactured by Ohara Corporation.

In Glass material data, five numerical values mentioned on a right side of GLA are a wavelength for a d-line, a wavelength for a C-line, a wavelength for an F-line, a wavelength for a g-line, and a wavelength for an e-line respectively. Each of the five numerical values mentioned on the right side of glass material name is refractive indices for each wavelength.

A shape of an aspherical surface is defined by the following expression where the direction of the optical axis is represented by z, the direction orthogonal to the optical axis is represented by y, a conical coefficient is represented by K, aspherical surface coefficients are represented by A4, A6, A8, A10 . . .

$$Z=(y^2/r)/[1+\{1-(1+K)(y/r)^2\}^{1/2}]+A4y^4+A6y^6+A8y^8+A10y^{10}+\ldots$$

Further, in the aspherical surface coefficients, 'E-n' (where, n is an integral number) indicates '$10^{-n}$'.

Since the ideal lens is treated as a thin lens, a thickness thereof is zero. A position at which the ideal lens is disposed is indicated by a surface number in surface data of numerical examples.

Example 1

Unit mm

Surface data

| Surface no. | r | d | GLA | nd | vd | ER |
|---|---|---|---|---|---|---|
| Object plane | ∞ | 16.8230 |  | 1. |  |  |
| 1 | ∞ | 0.2355 | C1 | 1.76900 | 64.15 | 1.178U |
| 2 | ∞ | 0.0673 |  | 1. |  | 1.178U |
| 3* | 1.5215 | 0.3365 | L-LAH53-M | 1.80258 | 40.72 | 0.858U |
| 4* | 0.3294 | 0.5114 |  | 1. |  | 0.538U |
| 5 | ∞ | 1.7664 | S-LAH58 | 1.88300 | 40.76 | 1.208U |
| 6 | ∞ | 3.5126 | S-LAH58 | 1.88300 | 40.76 | 1.208U |
| 7 | ∞ | 0.5249 | S-LAH58-M | 1.87933 | 40.60 | 1.208U |
| 8* | −2.4716 | 0.6460 |  | 1. |  | 1.208U |
| 9 | 11.0322 | 0.9084 | S-NBH56 | 1.85478 | 24.80 | 1.208U |
| 10 | 2.6426 | 1.0094 | S-FPL55 | 1.43875 | 94.66 | 1.208U |
| 11 | −3.3017 | 1.8673 |  | 1. |  | 1.208U |
| 12 | ∞ | 0.4038 | S-TIM22 | 1.64769 | 33.79 | 1.262U |
| 13 | 2.4989 | 3.1291 | S-FPL55 | 1.43875 | 94.66 | 1.262U |
| 14 | −4.4133 | 1.4434 |  | 1. |  | 1.262U |
| 15 | ∞ | 1.8875 |  | 1. |  | 1.346U |
| 16 | 5.7713 | 11.1032 | S-BAL35 | 1.58913 | 61.14 | 1.262U |
| 17 | ∞ | 0.2961 |  | 1. |  | 1.262U |
| 18* | 6.3564 | 1.0767 | S-FPL55-M | 1.43747 | 94.28 | 1.262U |
| 19 | −3.2818 | 1.3828 | S-YGH51 | 1.75500 | 52.32 | 1.262U |
| 20 | −6.3604 | 1.3794 |  | 1. |  | 1.236U |
| 21 | 6.3604 | 1.3828 | S-YGH51 | 1.75500 | 52.32 | 1.262U |
| 22 | 3.2818 | 1.0767 | S-FPL55-M | 1.43747 | 94.28 | 1.262U |
| 23* | −6.3564 | 0.2961 |  | 1. |  | 1.262U |
| 24 | ∞ | 11.1032 | S-BAL35 | 1.58913 | 61.14 | 1.262U |
| 25 | −5.7713 | 1.8875 |  | 1. |  | 1.262U |
| 26 | ∞ | 1.8875 |  | 1. |  | 1.346U |
| 27 | 5.7713 | 11.1032 | S-BAL35 | 1.58913 | 61.14 | 1.262U |
| 28 | ∞ | 0.2961 |  | 1. |  | 1.262U |
| 29* | 6.3564 | 1.0767 | S-FPL55-M | 1.43747 | 94.28 | 1.262U |
| 30 | −3.2818 | 1.3828 | S-YGH51 | 1.75500 | 52.32 | 1.262U |
| 31 | −6.3604 | 1.3794 |  | 1. |  | 1.236U |
| 32 | 6.3604 | 1.3828 | S-YGH51 | 1.75500 | 52.32 | 1.262U |
| 33 | 3.2818 | 1.0767 | S-FPL55-M | 1.43747 | 94.28 | 1.262U |
| 34* | −6.3564 | 0.2961 |  | 1. |  | 1.262U |
| 35 | ∞ | 11.1032 | S-BAL35 | 1.58913 | 61.14 | 1.262U |
| 36 | −5.7713 | 1.8875 |  | 1. |  | 1.262U |
| 37 | ∞ | 1.8875 |  | 1. |  | 1.346U |
| 38 | 5.7713 | 11.1032 | S-BAL35 | 1.58913 | 61.14 | 1.262U |
| 39 | ∞ | 0.2961 |  | 1. |  | 1.262U |
| 40* | 6.3564 | 1.0767 | S-FPL55-M | 1.43747 | 94.28 | 1.262U |
| 41 | −3.2818 | 1.3828 | S-YGH51 | 1.75500 | 52.32 | 1.262U |
| 42 | −6.3604 | 0.6897 |  | 1. |  | 1.262U |
| 43(Stop) | ∞ | 0.6897 |  | 1. |  | 1.112U |
| 44 | 6.3604 | 1.3828 | S-YGH51 | 1.75500 | 52.32 | 1.262U |
| 45 | 3.2818 | 1.0767 | S-FPL55-M | 1.43747 | 94.28 | 1.262U |
| 46* | −6.3564 | 0.2961 |  | 1. |  | 1.262U |
| 47 | ∞ | 11.1032 | S-BAL35 | 1.58913 | 61.14 | 1.262U |
| 48 | −5.7713 | 1.8875 |  | 1. |  | 1.262U |
| 49 | ∞ | 5.4944 |  | 1. |  | 1.682U |
| 50 | 11.4019 | 1.5814 | S-FPL51 | 1.49700 | 81.54 | 1.682U |
| 51 | −7.8705 | 0.2355 |  | 1. |  | 1.682U |
| 52 | ∞ | 0.5047 | S-LAH60 | 1.83400 | 37.16 | 1.682U |
| 53 | 4.4658 | 3.3646 | S-BAL35 | 1.58913 | 61.14 | 1.682U |
| 54 | −6.7975 | 2.0860 |  | 1. |  | 1.682U |
| 55 | ∞ | 1.0094 | C2 | 1.76819 | 71.70 | 1.514U |
| 56 | ∞ | 3.5328 |  | 1. |  | 1.514U |
| 57 | ∞ | 8.1561 |  | 1. |  | 1.024 |
| Image plane | ∞ |  |  |  |  |  |

Aspherical surface data

3rd surface k = −0.6370
A2 = 0.0000E+00, A4 = −1.5319E−01, A6 = 3.7826E−02,
A8 = 0.0000E+00, A10 = 0.0000E+00

4th surface k = −0.8270
A2 = 0.0000E+00, A4 = 1.2337E−01, A6 = −1.0383E+00,
A8 = 0.0000E+00, A10 = 0.0000E+00

8th surface k = −0.3780
A2 = 0.0000E+00, A4 = 4.7048E−03, A6 = 0.0000E+00,
A8 = 0.0000E+00, A10 = 0.0000E+00

18th surface k = 2.0710
A2 = 0.0000E+00, A4 = −1.7948E−03, A6 = 0.0000E+00,
A8 = 0.0000E+00, A10 = 0.0000E+00

23rd surface k = 2.0710
A2 = 0.0000E+00, A4 = 1.7948E−03, A6 = 0.0000E+00,
A8 = 0.0000E+00, A10 = 0.0000E+00

29th surface k = 2.0710
A2 = 0.0000E+00, A4 = −1.7948E−03, A6 = 0.0000E+00,
A8 = 0.0000E+00, A10 = 0.0000E+00

34th surface k = 2.0710
A2 = 0.0000E+00, A4 = 1.7948E−03, A6 = 0.0000E+00,
A8 = 0.0000E+00, A10 = 0.0000E+00

40th surface k = 2.0710
A2 = 0.0000E+00, A4 = −1.7948E−03, A6 = 0.0000E+00,
A8 = 0.0000E+00, A10 = 0.0000E+00

46th surface k = 2.0710
A2 = 0.0000E+00, A4 = 1.7948E−03, A6 = 0.0000E+00,
A8 = 0.0000E+00, A10 = 0.0000E+00

-continued

Unit mm

Various data

| | |
|---|---|
| OB | 16.8230 |
| FOV | 89.9 |
| NAI | 0.1257 |
| IH | 1 |
| IHtotal | 1.022 |

Glass material data

| GLA | 587.56 | 656.27 | 486.13 | 435.83 | 546.07 |
|---|---|---|---|---|---|
| C2 | 1.768189 | 1.765244 | 1.775956 | 1.783503 | 1.770656 |
| C1 | 1.768999 | 1.765391 | 1.777377 | 1.784102 | 1.771846 |
| L-LAH53-M | 1.802580 | 1.796720 | 1.816430 | 1.827650 | 1.807260 |
| S-BAL35 | 1.589130 | 1.586188 | 1.595824 | 1.601034 | 1.591429 |
| S-FPL51 | 1.496999 | 1.495136 | 1.501231 | 1.504507 | 1.498455 |
| S-FPL55-M | 1.437470 | 1.436040 | 1.440680 | 1.443150 | 1.438570 |
| S-FPL55 | 1.438750 | 1.437328 | 1.441963 | 1.444438 | 1.439857 |
| S-LAH58-M | 1.879330 | 1.872890 | 1.894550 | 1.906830 | 1.884480 |
| S-LAH58 | 1.882997 | 1.876560 | 1.898221 | 1.910497 | 1.888146 |
| S-LAH60 | 1.834000 | 1.827376 | 1.849819 | 1.862781 | 1.839323 |
| S-NBH56 | 1.854780 | 1.844876 | 1.879345 | 1.900448 | 1.862904 |
| S-TIM22 | 1.647689 | 1.642096 | 1.661263 | 1.672645 | 1.652221 |
| S-YGH51 | 1.754999 | 1.750624 | 1.765055 | 1.772956 | 1.758437 |

Ideal lens

| | |
|---|---|
| Displacement position | 57 (Pupil) |
| Focal length | 7.9579 |

Example 2

Unit mm

Surface data

| Surface no. | r | d | GLA | nd | vd | ER |
|---|---|---|---|---|---|---|
| Object plane | ∞ | 16.8197 | | 1. | | |
| 1 | ∞ | 0.2355 | C1 | 1.76900 | 64.15 | 1.177U |
| 2 | ∞ | 0.0673 | | 1. | | 1.177U |
| 3* | 1.3070 | 0.3364 | L-LAH53 | 1.80625 | 40.91 | 0.858U |
| 4* | 0.3190 | 0.5201 | | 1. | | 0.538U |
| 5 | ∞ | 1.7661 | S-LAH58 | 1.88300 | 40.76 | 1.228U |
| 6 | ∞ | 3.3639 | S-LAH58 | 1.88300 | 40.76 | 1.228U |
| 7 | ∞ | 0.6728 | S-LAH58 | 1.88300 | 40.76 | 1.228U |
| 8* | −2.3183 | 0.1682 | | 1. | | 1.228U |
| 9 | 19.0162 | 1.0120 | S-FPM2 | 1.59522 | 67.74 | 1.228U |
| 10 | −2.5940 | 0.4037 | S-NBH56 | 1.85478 | 24.80 | 1.228U |
| 11 | −7.7939 | 1.6481 | | 1. | | 1.228U |
| 12 | ∞ | 0.4037 | S-TIM35 | 1.69895 | 30.13 | 1.228U |
| 13 | 2.1235 | 3.5799 | S-FPL55 | 1.43875 | 94.66 | 1.228U |
| 14 | −3.6172 | 1.7164 | | 1. | | 1.228U |
| 15 | ∞ | 1.6315 | | 1. | | 1.346U |
| 16 | 5.9168 | 10.7646 | S-BAL35 | 1.58913 | 61.14 | 1.261U |
| 17 | ∞ | 0.6997 | | 1. | | 1.261U |
| 18 | 6.4187 | 1.6315 | S-FPL51 | 1.49700 | 81.54 | 1.261U |
| 19 | −3.4729 | 0.1413 | ResinA | 1.60397 | 28.60 | 1.261U |
| 20* | −2.9149 | 1.3119 | L-LAH53 | 1.80625 | 40.91 | 1.261U |
| 21 | −6.8974 | 0.5046 | | 1. | | 1.236U |
| 22 | 6.8974 | 1.3119 | L-LAH53 | 1.80625 | 40.91 | 1.261U |
| 23* | 2.9149 | 0.1413 | ResinA | 1.60397 | 28.60 | 1.261U |
| 24 | 3.4729 | 1.6315 | S-FPL51 | 1.49700 | 81.54 | 1.261U |
| 25 | −6.4187 | 0.6997 | | 1. | | 1.261U |
| 26 | ∞ | 10.7646 | S-BAL35 | 1.58913 | 61.14 | 1.261U |
| 27 | −5.9168 | 1.6315 | | 1. | | 1.261U |
| 28 | ∞ | 1.6315 | | 1. | | 1.346U |
| 29 | 5.916 | 10.7646 | S-BAL35 | 1.58913 | 61.14 | 1.261U |
| 30 | ∞ | 0.6997 | | 1. | | 1.261U |
| 31 | 6.4187 | 1.6315 | S-FPL51 | 1.49700 | 81.54 | 1.261U |
| 32 | −3.4729 | 0.1413 | ResinA | 1.60397 | 28.60 | 1.261U |
| 33* | −2.9149 | 1.3119 | L-LAH53 | 1.80625 | 40.91 | 1.261U |
| 34 | −6.8974 | 0.5046 | | 1. | | 1.236U |
| 35 | 6.8974 | 1.3119 | L-LAH53 | 1.80625 | 40.91 | 1.261U |
| 36* | 2.9149 | 0.1413 | ResinA | 1.60397 | 28.60 | 1.261U |
| 37 | 3.4729 | 1.6315 | S-FPL51 | 1.49700 | 81.54 | 1.261U |
| 38 | −6.4187 | 0.6997 | | 1. | | 1.261U |
| 39 | ∞ | 10.7646 | S-BAL35 | 1.58913 | 61.14 | 1.261U |
| 40 | −5.9168 | 1.6315 | | 1. | | 1.261U |
| 41 | ∞ | 1.6315 | | 1. | | 1.346U |
| 42 | 5.9168 | 10.7646 | S-BAL35 | 1.58913 | 61.14 | 1.261U |
| 43 | ∞ | 0.6997 | | 1. | | 1.261U |
| 44 | 6.4187 | 1.6315 | S-FPL51 | 1.49700 | 81.54 | 1.261U |
| 45 | −3.4729 | 0.1413 | ResinA | 1.60397 | 28.60 | 1.261U |
| 46* | −2.9149 | 1.3119 | L-LAH53 | 1.80625 | 40.91 | 1.261U |
| 47 | −6.8974 | 0.2523 | | 1. | | 1.261U |
| 48(Stop) | ∞ | 0.2523 | | 1. | | 1.132U |
| 49 | 6.8974 | 1.3119 | L-LAH53 | 1.80625 | 40.91 | 1.261U |
| 50* | 2.9149 | 0.1413 | ResinA | 1.60397 | 28.60 | 1.261U |
| 51 | 3.4729 | 1.6315 | S-FPL51 | 1.49700 | 81.54 | 1.261U |
| 52 | −6.4187 | 0.6997 | | 1. | | 1.261U |
| 53 | ∞ | 10.7646 | S-BAL35 | 1.58913 | 61.14 | 1.261U |
| 54 | −5.9168 | 1.6315 | | 1. | | 1.261U |
| 55 | ∞ | 5.4933 | | 1. | | 1.682U |
| 56 | 11.3997 | 1.5811 | S-FPL51 | 1.49700 | 81.54 | 1.682U |
| 57 | −7.8689 | 0.2355 | | 1. | | 1.682U |
| 58 | ∞ | 0.5046 | S-LAH60 | 1.83400 | 37.16 | 1.682U |
| 59 | 4.4650 | 3.3639 | S-BAL35 | 1.58913 | 61.14 | 1.682U |
| 60 | −6.7962 | 2.0856 | | 1. | | 1.682U |
| 61 | ∞ | 1.0092 | C2 | 1.76819 | 71.70 | 1.514U |
| 62 | ∞ | 3.5322 | | 1. | | 1.514U |
| 63 | ∞ | 8.1546 | | 1. | | 1.024 |
| Image plane | ∞ | | | | | |

Aspherical surface data

3rd surface k = −1.3092
A2 = 0.0000E+00, A4 = −1.6738E−01, A6 = 4.6466E−02,
A8 = 0.0000E+00, A10 = 0.0000E+00

4th surface k = −1.0441
A2 = 0.0000E+00, A4 = 9.0726E−01, A6 = −5.8418E−01,
A8 = 0.0000E+00, A10 = 0.0000E+00

8th surface k = −0.5063
A2 = 0.0000E+00, A4 = 2.1582E−03, A6 = 0.0000E+00,
A8 = 0.0000E+00, A10 = 0.0000E+00

20th surface k = −0.2320
A2 = 0.0000E+00, A4 = −1.6626E−03, A6 = 0.0000E+00,
A8 = 0.0000E+00, A10 = 0.0000E+00

23rd surface k = −0.2320
A2 = 0.0000E+00, A4 = 1.6626E−03, A6 = 0.0000E+00,
A8 = 0.0000E+00, A10 = 0.0000E+00

33rd surface k = −0.2320
A2 = 0.0000E+00, A4 = −1.6626E−03, A6 = 0.0000E+00,
A8 = 0.0000E+00, A10 = 0.0000E+00

36th surface k = −0.2320
A2 = 0.0000E+00, A4 = 1.6626E−03, A6 = 0.0000E+00,
A8 = 0.0000E+00, A10 = 0.0000E+00

46th surface k = −0.2320
A2 = 0.0000E+00, A4 = −1.6626E−03, A6 = 0.0000E+00,
A8 = 0.0000E+00, A10 = 0.0000E+00

-continued

| Unit mm |
|---|
| 50th surface |
| k = −0.2320<br>A2 = 0.0000E+00, A4 = 1.6626E−03, A6 = 0.0000E+00,<br>A8 = 0.0000E+00, A10 = 0.0000E+00 |

Various data

| OB | 16.8197 |
|---|---|
| FOV | 89.9 |
| NAI | 0.1258 |
| IH | 1.00 |
| IHtotal | 1.022 |

Glass material data

| GLA | 587.56 | 656.27 | 486.13 | 435.83 | 546.07 |
|---|---|---|---|---|---|
| C2 | 1.768189 | 1.765244 | 1.775956 | 1.783503 | 1.770656 |
| C1 | 1.768999 | 1.765391 | 1.777377 | 1.784102 | 1.771846 |
| L-LAH53 | 1.806250 | 1.800394 | 1.820103 | 1.831320 | 1.810931 |
| ResinA | 1.603970 | 1.597970 | 1.619090 | 1.632280 | 1.608930 |
| S-BAL35 | 1.589130 | 1.586188 | 1.595824 | 1.601034 | 1.591429 |
| S-FPL51 | 1.496999 | 1.495136 | 1.501231 | 1.504507 | 1.498455 |
| S-FPL55 | 1.438750 | 1.437328 | 1.441963 | 1.444438 | 1.439857 |
| S-FPM2 | 1.595220 | 1.592555 | 1.601342 | 1.606124 | 1.597316 |
| S-LAH58 | 1.882997 | 1.876560 | 1.898221 | 1.910497 | 1.888146 |
| S-LAH60 | 1.834600 | 1.827376 | 1.849819 | 1.862781 | 1.839323 |
| S-NBH56 | 1.854780 | 1.844876 | 1.879345 | 1.900448 | 1.862904 |
| S-TIM35 | 1.698947 | 1.692225 | 1.715424 | 1.729412 | 1.704424 |

Ideal lens

| Displacement position | 63 (Pupil) |
|---|---|
| Focal length | 7.95829 |

Example 3

| Unit mm | | | | | |
|---|---|---|---|---|---|
| Surface data | | | | | |
| Surface no. | r | d | GLA | nd | vd | ER |
| Object plane | ∞ | 16.8199 | | 1. | | |
| 1 | ∞ | 0.2355 | C1 | 1.76900 | 64.15 | 1.177U |
| 2 | ∞ | 0.0673 | | 1. | | 1.177U |
| 3* | 1.3459 | 0.3364 | L-LAH53 | 1.80625 | 40.91 | 0.858U |
| 4* | 0.3191 | 0.5159 | | 1. | | 0.538U |
| 5 | ∞ | 1.7661 | S-LAH58 | 1.88300 | 40.76 | 1.228U |
| 6 | ∞ | 3.3640 | S-LAH58 | 1.88300 | 40.76 | 1.228U |
| 7 | ∞ | 0.6728 | S-LAH58 | 1.88300 | 40.76 | 1.228U |
| 8* | −2.3437 | 0.1682 | | 1. | | 1.228U |
| 9 | 15.8207 | 1.0460 | S-FPL55 | 1.43875 | 94.66 | 1.228U |
| 10 | −2.1228 | 0.4037 | S-NBH55 | 1.80000 | 29.84 | 1.228U |
| 11 | −3.3846 | 0.7204 | | 1. | | 1.228U |
| 12 | ∞ | 1.3594 | S-NBH56 | 1.85478 | 24.80 | 1.228U |
| 13 | 2.1774 | 4.1946 | S-FPL55 | 1.43875 | 94.66 | 1.228U |
| 14 | −3.5489 | 1.5059 | | 1. | | 1.228U |
| 15 | ∞ | 1.6315 | | 1. | | 1.346U |
| 16 | 5.9169 | 10.7648 | S-BAL35 | 1.58913 | 61.14 | 1.261U |
| 17 | ∞ | 0.6997 | | 1. | | 1.261U |
| 18 | 6.4188 | 1.6315 | S-FPL51 | 1.49700 | 81.54 | 1.261U |
| 19 | −3.4730 | 0.1413 | ResinA | 1.60397 | 28.60 | 1.261U |
| 20* | −2.9149 | 1.3120 | L-LAH53 | 1.80625 | 40.91 | 1.261U |
| 21 | −6.8975 | 0.5046 | | 1. | | 1.236U |
| 22 | 6.8975 | 1.3120 | L-LAH53 | 1.80625 | 40.91 | 1.261U |
| 23* | 2.9149 | 0.1413 | ResinA | 1.60397 | 28.60 | 1.261U |
| 24 | 3.4730 | 1.6315 | S-FPL51 | 1.49700 | 81.54 | 1.261U |
| 25 | −6.4188 | 0.6997 | | 1. | | 1.261U |
| 26 | ∞ | 10.7648 | S-BAL35 | 1.58913 | 61.14 | 1.261U |
| 27 | −5.9169 | 1.6315 | | 1. | | 1.261U |
| 28 | ∞ | 1.6315 | | 1. | | 1.346U |
| 29 | 5.9169 | 10.7648 | S-BAL35 | 1.58913 | 61.14 | 1.261U |
| 30 | ∞ | 0.6997 | | 1. | | 1.261U |
| 31 | 6.4188 | 1.6315 | S-FPL51 | 1.49700 | 81.54 | 1.261U |
| 32 | −3.4730 | 0.1413 | ResinA | 1.60397 | 28.60 | 1.261U |
| 33* | −2.9149 | 1.3120 | L-LAH53 | 1.80625 | 40.91 | 1.261U |
| 34 | −6.8975 | 0.5046 | | 1. | | 1.236U |
| 35 | 6.8975 | 1.3120 | L-LAH53 | 1.80625 | 40.91 | 1.261U |
| 36* | 2.9149 | 0.1413 | ResinA | 1.60397 | 28.60 | 1.261U |
| 37 | 3.4730 | 1.6315 | S-FPL51 | 1.49700 | 81.54 | 1.261U |
| 38 | −6.4188 | 0.6997 | | 1. | | 1.261U |
| 39 | ∞ | 10.7648 | S-BAL35 | 1.58913 | 61.14 | 1.261U |
| 40 | −5.9169 | 1.6315 | | 1. | | 1.261U |
| 41 | ∞ | 1.6315 | | 1. | | 1.346U |
| 42 | 5.9169 | 10.7648 | S-BAL35 | 1.58913 | 61.14 | 1.261U |
| 43 | ∞ | 0.6997 | | 1. | | 1.261U |
| 44 | 6.4188 | 1.6315 | S-FPL51 | 1.49700 | 81.54 | 1.261U |
| 45 | −3.4730 | 0.1413 | ResinA | 1.60397 | 28.60 | 1.261U |
| 46* | −2.9149 | 1.3120 | L-LAH53 | 1.80625 | 40.91 | 1.261U |
| 47 | −6.8975 | 0.2523 | | 1. | | 1.261U |
| 48(Stop) | ∞ | 0.2523 | | 1. | | 1.132U |
| 49 | 6.8975 | 1.3120 | L-LAH53 | 1.80625 | 40.91 | 1.261U |
| 50* | 2.9149 | 0.1413 | ResinA | 1.60397 | 28.60 | 1.261U |
| 51 | 3.4730 | 1.6315 | S-FPL51 | 1.49700 | 81.54 | 1.261U |
| 52 | −6.4188 | 0.6997 | | 1. | | 1.261U |
| 53 | ∞ | 10.7648 | S-BAL35 | 1.58913 | 61.14 | 1.261U |
| 54 | −5.9169 | 1.6315 | | 1. | | 1.261U |
| 55 | ∞ | 5.4934 | | 1. | | 1.682U |
| 56 | 11.3999 | 1.5811 | S-FPL51 | 1.49700 | 81.54 | 1.682U |
| 57 | −7.8690 | 0.2355 | | 1. | | 1.682U |
| 58 | ∞ | 0.5046 | S-LAH60 | 1.83400 | 37.16 | 1.682U |
| 59 | 4.4650 | 3.3640 | S-BAL35 | 1.58913 | 61.14 | 1.682U |
| 60 | −6.7963 | 2.0857 | | 1. | | 1.682U |
| 61 | ∞ | 1.0092 | C2 | 1.76819 | 71.70 | 1.514U |
| 62 | ∞ | 3.5322 | | 1. | | 1.514U |
| 63 | ∞ | 8.1547 | | 1. | | 1.024 |
| Image plane | ∞ | | | | | |

Aspherical surface data

3rd surface k = −1.1018
A2 = 0.0000E+00, A4 = −1.8061E−01, A6 = 4.9979E−02,
A8 = 0.0000E+00, A10 = 0.0000E+00

4th surface k = −0.9631
A2 = 0.0000E+00, A4 = 5.6067E−01, A6 = −6.7675E−01,
A8 = 0.0000E+00, A10 = 0.0000E+00

8th surface k = −0.3218
A2 = 0.0000E+00, A4 = 5.0666E−03, A6 = 0.0000E+00,
A8 = 0.0000E+00, A10 = 0.0000E+00

20th surface k = −0.2320
A2 = 0.0000E+00, A4 = −1.6625E−03, A6 = 0.0000E+00,
A8 = 0.0000E+00, A10 = 0.0000E+00

23rd surface k = −0.2320
A2 = 0.0000E+00, A4 = 1.6625E−03, A6 = 0.0000E+00,
A8 = 0.0000E+00, A10 = 0.0000E+00

33rd surface k = −0.2320
A2 = 0.0000E+00, A4 = −1.6625E−03, A6 = 0.0000E+00,
A8 = 0.0000E+00, A10 = 0.0000E+00

36th surface k = −0.2320
A2 = 0.0000E+00, A4 = 1.6625E−03, A6 = 0.0000E+00,
A8 = 0.0000E+00, A10 = 0.0000E+00

-continued

Unit mm

46th surface k = −0.2320
A2 = 0.0000E+00, A4 = −1.6625E−03, A6 = 0.0000E+00,
A8 = 0.0000E+00, A10 = 0.0000E+00

50th surface k = −0.2320
A2 = 0.0000E+00, A4 = 1.6625E−03, A6 = 0.0000E+00,
A8 = 0.0000E+00, A10 = 0.0000E+00

Various data

| | |
|---|---|
| OB | 16.8199 |
| FOV | 89.9 |
| NAI | 0.1258 |
| IH | 1.00 |
| IHtotal | 1.022 |

Glass material data

| GLA | 587.56 | 656.27 | 486.13 | 435.83 | 546.07 |
|---|---|---|---|---|---|
| C2 | 1.768189 | 1.765244 | 1.775956 | 1.783503 | 1.770656 |
| C1 | 1.768999 | 1.765391 | 1.777377 | 1.784102 | 1.771846 |
| L-LAH53 | 1.806250 | 1.800394 | 1.820103 | 1.831320 | 1.810931 |
| ResinA | 1.603970 | 1.597970 | 1.619090 | 1.632280 | 1.608930 |
| S-BAL35 | 1.589130 | 1.586188 | 1.595824 | 1.601034 | 1.591429 |
| S-FPL51 | 1.496999 | 1.495136 | 1.501231 | 1.504507 | 1.498455 |
| S-FPL55 | 1.438750 | 1.437328 | 1.441963 | 1.444438 | 1.439857 |
| S-LAH58 | 1.882997 | 1.876560 | 1.898221 | 1.910497 | 1.888146 |
| S-LAH60 | 1.834000 | 1.827376 | 1.849819 | 1.862781 | 1.839323 |
| S-NBH55 | 1.800000 | 1.792237 | 1.819043 | 1.835172 | 1.806331 |
| S-NBH56 | 1.854780 | 1.844876 | 1.879345 | 1.900448 | 1.862904 |

Ideal lens

| | |
|---|---|
| Displacement position | 63 (Pupil) |
| Focal length | 7.9592 |

Example 4

Unit mm

Surface data

| Surface no. | r | d | GLA | nd | vd | ER |
|---|---|---|---|---|---|---|
| Object plane | ∞ | 16.8228 | | 1. | | |
| 1 | ∞ | 0.2355 | C1 | 1.76900 | 64.15 | 1.178U |
| 2 | ∞ | 0.0673 | | 1. | | 1.178U |
| 3* | 1.4961 | 0.3365 | L-LAH53-M | 1.80258 | 40.72 | 0.858U |
| 4* | 0.3268 | 0.5107 | | 1. | | 0.538U |
| 5 | ∞ | 1.7664 | S-LAH58 | 1.88300 | 40.76 | 1.208U |
| 6 | ∞ | 3.5126 | S-LAH58 | 1.88300 | 40.76 | 1.208U |
| 7 | ∞ | 0.5249 | S-LAH58-M | 1.87933 | 40.60 | 1.208U |
| 8* | −2.5674 | 0.4390 | | 1. | | 1.208U |
| 9 | 12.4246 | 0.7023 | S-LAH79 | 2.00330 | 28.27 | 1.208U |
| 10 | 3.2173 | 0.8392 | S-FPL55 | 1.43875 | 94.66 | 1.208U |
| 11 | −3.0361 | 2.3530 | | 1. | | 1.208U |
| 12 | 11.1975 | 0.4017 | S-NBH55 | 1.80000 | 29.84 | 1.262U |
| 13 | 2.5079 | 3.4709 | S-FPL55 | 1.43875 | 94.66 | 1.262U |
| 14 | −4.3535 | 1.6185 | | 1. | | 1.262U |
| 15 | ∞ | 1.8875 | | 1. | | 1.346U |
| 16 | 5.7712 | 11.1031 | S-BAL35 | 1.58913 | 61.14 | 1.262U |
| 17 | ∞ | 0.2961 | | 1. | | 1.262U |
| 18* | 6.3563 | 1.0767 | S-FPL55-M | 1.43747 | 94.28 | 1.262U |
| 19 | −3.2818 | 1.3828 | S-YGH51 | 1.75500 | 52.32 | 1.262U |
| 20 | −6.3604 | 1.3794 | | 1. | | 1.236U |
| 21 | 6.3604 | 1.3828 | S-YGH51 | 1.75500 | 52.32 | 1.262U |
| 22 | 3.2818 | 1.0767 | S-FPL55-M | 1.43747 | 94.28 | 1.262U |
| 23* | −6.3563 | 0.2961 | | 1. | | 1.262U |
| 24 | ∞ | 11.1031 | S-BAL35 | 1.58913 | 61.14 | 1.262U |
| 25 | −5.7712 | 1.8875 | | 1. | | 1.262U |
| 26 | ∞ | 1.8875 | | 1. | | 1.346U |
| 27 | 5.7712 | 11.1031 | S-BAL35 | 1.58913 | 61.14 | 1.262U |
| 28 | ∞ | 0.2961 | | 1. | | 1.262U |
| 29* | 6.3563 | 1.0767 | S-FPL55-M | 1.43747 | 94.28 | 1.262U |
| 30 | −3.2818 | 1.3828 | S-YGH51 | 1.75500 | 52.32 | 1.262U |
| 31 | −6.3604 | 1.3794 | | 1. | | 1.236U |
| 32 | 6.3604 | 1.3828 | S-YGH51 | 1.75500 | 52.32 | 1.262U |
| 33 | 3.2818 | 1.0767 | S-FPL55-M | 1.43747 | 94.28 | 1.262U |
| 34* | −6.3563 | 0.2961 | | 1. | | 1.262U |
| 35 | ∞ | 11.1031 | S-BAL35 | 1.58913 | 61.14 | 1.262U |
| 36 | −5.7712 | 1.8875 | | 1. | | 1.262U |
| 37 | ∞ | 1.8875 | | 1. | | 1.346U |
| 38 | 5.7712 | 11.1031 | S-BAL35 | 1.58913 | 61.14 | 1.262U |
| 39 | ∞ | 0.2961 | | 1. | | 1.262U |
| 40* | 6.3563 | 1.0767 | S-FPL55-M | 1.43747 | 94.28 | 1.262U |
| 41 | −3.2818 | 1.3828 | S-YGH51 | 1.75500 | 52.32 | 1.262U |
| 42 | −6.3604 | 0.6897 | | 1. | | 1.262U |
| 43(Stop) | ∞ | 0.6897 | | 1. | | 1.113U |
| 44 | 6.3604 | 1.3828 | S-YGH51 | 1.75500 | 52.32 | 1.262U |
| 45 | 3.2818 | 1.0767 | S-FPL55-M | 1.43747 | 94.28 | 1.262U |
| 46* | −6.3563 | 0.2961 | | 1. | | 1.262U |
| 47 | ∞ | 11.1031 | S-BAL35 | 1.58913 | 61.14 | 1.262U |
| 48 | −5.7712 | 1.8875 | | 1. | | 1.262U |
| 49 | ∞ | 5.4943 | | 1. | | 1.682U |
| 50 | 11.4018 | 1.5813 | S-FPL51 | 1.49700 | 81.54 | 1.682U |
| 51 | −7.8704 | 0.2355 | | 1. | | 1.682U |
| 52 | ∞ | 0.5047 | S-LAH60 | 1.83400 | 37.16 | 1.682U |
| 53 | 4.4658 | 3.3646 | S-BAL35 | 1.58913 | 61.14 | 1.682U |
| 54 | −6.7974 | 2.0860 | | 1. | | 1.682U |
| 55 | ∞ | 1.0094 | C2 | 1.76819 | 71.70 | 1.514U |
| 56 | ∞ | 3.5328 | | 1. | | 1.514U |
| 57 | ∞ | 8.1560 | | 1. | | 1.025 |
| Image plane | ∞ | | | | | |

Aspherical surface data

3rd surface k = 0.0846
A2 = 0.0000E+00, A4 = −1.8088E−01, A6 = 2.2653E−02,
A8 = 0.0000E+00, A10 = 0.0000E+00

4th surface k = −0.8324
A2 = 0.0000E+00, A4 = 1.3905E−01, A6 = −1.1893E+00,
A8 = 0.0000E+00, A10 = 0.0000E+00

8th surface k = −0.3217
A2 = 0.0000E+00, A4 = 5.1401E−03, A6 = 0.0000E+00,
A8 = 0.0000E+00, A10 = 0.0000E+00

18th surface k = 2.0710
A2 = 0.0000E+00, A4 = −1.7948E−03, A6 = 0.0000E+00,
A8 = 0.0000E+00, A10 = 0.0000E+00

23rd surface k = 2.0710
A2 = 0.0000E+00, A4 = 1.7948E−03, A6 = 0.0000E+00,
A8 = 0.0000E+00, A10 = 0.0000E+00

29th surface k = 2.0710
A2 = 0.0000E+00, A4 = −1.7948E−03, A6 = 0.0000E+00,
A8 = 0.0000E+00, A10 = 0.0000E+00

34th surface k = 2.0710
A2 = 0.0000E+00, A4 = 1.7948E−03, A6 = 0.0000E+00,
A8 = 0.0000E+00, A10 = 0.0000E+00

40th surface k = 2.0710
A2 = 0.0000E+00, A4 = −1.7948E−03, A6 = 0.0000E+00,
A8 = 0.0000E+00, A10 = 0.0000E+00

-continued

Unit mm

46th surface k = 2.0710
A2 = 0.0000E + 00, A4 = 1.7948E−03, A6 = 0.0000E+00,
A8 = 0.0000E+00, A10 = 0.0000E+00

Various data

| | |
|---|---|
| OB | 16.8228 |
| FOV | 87.7 |
| NAI | 0.1259 |
| IH | 1.00 |
| IHtotal | 1.022 |

Glass material data

| GLA | 587.56 | 656.27 | 486.13 | 435.83 | 546.07 |
|---|---|---|---|---|---|
| C2 | 1.768189 | 1.765244 | 1.775956 | 1.783503 | 1.770656 |
| C1 | 1.768999 | 1.765391 | 1.777377 | 1.784102 | 1.771846 |

-continued

Unit mm

| L-LAH53-M | 1.802580 | 1.796720 | 1.816430 | 1.827650 | 1.807260 |
|---|---|---|---|---|---|
| S-BAL35 | 1.589130 | 1.586188 | 1.595824 | 1.601034 | 1.591429 |
| S-FPL51 | 1.496999 | 1.495136 | 1.501231 | 1.504507 | 1.498455 |
| S-FPL55-M | 1.437470 | 1.436040 | 1.440680 | 1.443150 | 1.438570 |
| S-FPL55 | 1.438750 | 1.437328 | 1.441963 | 1.444438 | 1.439857 |
| S-LAH58-M | 1.879330 | 1.872890 | 1.894550 | 1.906830 | 1.884480 |
| S-LAH58 | 1.882997 | 1.876560 | 1.898221 | 1.910497 | 1.888146 |
| S-LAH60 | 1.834000 | 1.827376 | 1.849819 | 1.862781 | 1.839323 |
| S-LAH79 | 2.003300 | 1.993011 | 2.028497 | 2.049716 | 2.011689 |
| S-NBH55 | 1.800000 | 1.792237 | 1.819043 | 1.835172 | 1.806331 |
| S-YGH51 | 1.754999 | 1.750624 | 1.765055 | 1.772956 | 1.758437 |

Ideal lens

| | |
|---|---|
| Displacement position | 57 (Pupil) |
| Focal length | 7.9572 |

Example 5

Unit mm

Surface data

| Surface no. | r | d | GLA | nd | vd | ER |
|---|---|---|---|---|---|---|
| Object plane | ∞ | 16.8228 | | 1. | | |
| 1 | ∞ | 0.2355 | C1 | 1.76900 | 64.15 | 1.178U |
| 2 | ∞ | 0.0673 | | 1. | | 1.178U |
| 3* | 1.5751 | 0.3365 | L-LAH53-M | 1.80258 | 40.72 | 0.858U |
| 4* | 0.3404 | 0.4913 | | 1. | | 0.538U |
| 5 | ∞ | 1.7664 | S-LAH58 | 1.88300 | 40.76 | 1.208U |
| 6 | ∞ | 3.5126 | S-LAH58 | 1.88300 | 40.76 | 1.208U |
| 7 | ∞ | 0.5249 | S-LAH58-M | 1.87933 | 40.60 | 1.208U |
| 8* | −2.5087 | 1.3498 | | 1. | | 1.208U |
| 9 | 12.3188 | 1.0829 | S-NPH4 | 1.89286 | 20.36 | 1.208U |
| 10 | 2.6422 | 0.8775 | S-FPL55 | 1.43875 | 94.66 | 1.208U |
| 11 | −3.5420 | 2.8488 | | 1. | | 1.208U |
| 12 | −11.0472 | 0.4090 | S-TIL6 | 1.53172 | 48.84 | 1.262U |
| 13 | 2.3950 | 1.5411 | S-LAL18 | 1.72916 | 54.68 | 1.262U |
| 14 | −71.6757 | 1.4837 | | 1. | | 1.262U |
| 15 | ∞ | 1.8875 | | 1. | | 1.346U |
| 16 | 5.7712 | 11.1031 | S-BAL35 | 1.58913 | 61.14 | 1.262U |
| 17 | ∞ | 0.2961 | | 1. | | 1.262U |
| 18* | 6.3563 | 1.0767 | S-FPL55-M | 1.43747 | 94.28 | 1.262U |
| 19 | −3.2818 | 1.3828 | S-YGH51 | 1.75500 | 52.32 | 1.262U |
| 20 | −6.3604 | 1.3794 | | 1. | | 1.236U |
| 21 | 6.3604 | 1.3828 | S-YGH51 | 1.75500 | 52.32 | 1.262U |
| 22 | 3.2818 | 1.0767 | S-FPL55-M | 1.43747 | 94.28 | 1.262U |
| 23* | −6.3563 | 0.2961 | | 1. | | 1.262U |
| 24 | ∞ | 11.1031 | S-BAL35 | 1.58913 | 61.14 | 1.262U |
| 25 | −5.7712 | 1.8875 | | 1. | | 1.262U |
| 26 | ∞ | 1.8875 | | 1. | | 1.346U |
| 27 | 5.7712 | 11.1031 | S-BAL35 | 1.58913 | 61.14 | 1.262U |
| 28 | ∞ | 0.2961 | | 1. | | 1.262U |
| 29* | 6.3563 | 1.0767 | S-FPL55-M | 1.43747 | 94.28 | 1.262U |
| 30 | −3.2818 | 1.3828 | S-YGH51 | 1.75500 | 52.32 | 1.262U |
| 31 | −6.3604 | 1.3794 | | 1. | | 1.236U |
| 32 | 6.3604 | 1.3828 | S-YGH51 | 1.75500 | 52.32 | 1.262U |
| 33 | 3.2818 | 1.0767 | S-FPL55-M | 1.43747 | 94.28 | 1.262U |
| 34* | −6.3563 | 0.2961 | | 1. | | 1.262U |
| 35 | ∞ | 11.1031 | S-BAL35 | 1.58913 | 61.14 | 1.262U |
| 36 | −5.7712 | 1.8875 | | 1. | | 1.262U |
| 37 | ∞ | 1.8875 | | 1. | | 1.346U |
| 38 | 5.7712 | 11.1031 | S-BAL35 | 1.58913 | 61.14 | 1.262U |
| 39 | ∞ | 0.2961 | | 1. | | 1.262U |
| 40* | 6.3563 | 1.0767 | S-FPL55-M | 1.43747 | 94.28 | 1.262U |
| 41 | −3.2818 | 1.3828 | S-YGH51 | 1.75500 | 52.32 | 1.262U |
| 42 | −6.3604 | 0.6897 | | 1. | | 1.262U |
| 43(Stop) | ∞ | 0.6897 | | 1. | | 1.114U |
| 44 | 6.3604 | 1.3828 | S-YGH51 | 1.75500 | 52.32 | 1.262U |
| 45 | 3.2818 | 1.0767 | S-FPL55-M | 1.43747 | 94.28 | 1.262U |
| 46* | −6.3563 | 0.2961 | | 1. | | 1.262U |
| 47 | ∞ | 11.1031 | S-BAL35 | 1.58913 | 61.14 | 1.262U |

-continued

| | | | Unit mm | | | |
|---|---|---|---|---|---|---|
| 48 | −5.7712 | 1.8875 | | 1. | | 1.262U |
| 49 | ∞ | 5.4943 | | 1. | | 1.682U |
| 50 | 11.4018 | 1.5813 | S-FPL51 | 1.49700 | 81.54 | 1.682U |
| 51 | −7.8704 | 0.2355 | | 1. | | 1.682U |
| 52 | ∞ | 0.5047 | S-LAH60 | 1.83400 | 37.16 | 1.682U |
| 53 | 4.4658 | 3.3646 | S-BAL35 | 1.58913 | 61.14 | 1.682U |
| 54 | −6.7974 | 2.0860 | | 1. | | 1.682U |
| 55 | ∞ | 1.0094 | C2 | 1.76819 | 71.70 | 1.514U |
| 56 | ∞ | 3.5328 | | 1. | | 1.514U |
| 57 | ∞ | 8.1560 | | 1. | | 1.025 |
| Image plane | ∞ | | | | | |

Aspherical surface data

3rd surface k = −0.1937
A2 = 0.0000E+00, A4 = −1.5432E−01, A6 = 2.6243E−02,
A8 = 0.0000E+00, A10 = 0.0000E+00

4th surface k = −0.8622
A2 = 0.0000E+00, A4 = 2.1364E−01, A6 = −6.1642E−01,
A8 = 0.0000E+00, A10 = 0.0000E+00

8th surface k = −0.4064
A2 = 0.0000E+00, A4 = 3.1257E−03, A6 = 0.0000E+00,
A8 = 0.0000E+00, A10 = 0.0000E+00

18th surface k = 2.0710
A2 = 0.0000E+00, A4 = −1.7948E−03, A6 = 0.0000E+00,
A8 = 0.0000E+00, A10 = 0.0000E+00

23rd surface k = 2.0710
A2 = 0.0000E+00, A4 = 1.7948E−03, A6 = 0.0000E+00,
A8 = 0.0000E+00, A10 = 0.0000E+00

29th surface k = 2.0710
A2 = 0.0000E+00, A4 = −1.7948E−03, A6 = 0.0000E+00,
A8 = 0.0000E+00, A10 = 0.0000E+00

34th surface k = 2.0710
A2 = 0.0000E+00, A4 = 1.7948E−03, A6 = 0.0000E+00,
A8 = 0.0000E+00, A10 = 0.0000E+00

40th surface k = 2.0710
A2 = 0.0000E+00, A4 = −1.7948E−03, A6 = 0.0000E+00,
A8 = 0.0000E+00, A10 = 0.0000E+00

46th surface k = 2.0710
A2 = 0.0000E+00, A4 = 1.7948E−03, A6 = 0.0000E+00,
A8 = 0.0000E+00, A10 = 0.0000E+00

Various data

| | | |
|---|---|---|
| OB | | 16.8228 |
| FOV | | 89.6 |
| NAI | | 0.1259 |
| IH | | 1.00 |
| IHtotal | | 1.022 |

Glass material data

| GLA | 587.56 | 656.27 | 486.13 | 435.83 | 546.07 |
|---|---|---|---|---|---|
| C2 | 1.768189 | 1.765244 | 1.775956 | 1.783503 | 1.770656 |
| C1 | 1.768999 | 1.765391 | 1.777377 | 1.784102 | 1.771846 |
| L-LAH53-M | 1.802580 | 1.796720 | 1.816430 | 1.827650 | 1.807260 |
| S-BAL35 | 1.589130 | 1.586188 | 1.595824 | 1.601034 | 1.591429 |
| S-FPL51 | 1.496999 | 1.495136 | 1.501231 | 1.504507 | 1.498455 |

-continued

| Unit mm | | | | | |
|---|---|---|---|---|---|
| S-FPL55-M | 1.437470 | 1.436040 | 1.440680 | 1.443150 | 1.438570 |
| S-FPL55 | 1.438750 | 1.437328 | 1.441963 | 1.444438 | 1.439857 |
| S-LAH58-M | 1.879330 | 1.872890 | 1.894550 | 1.906830 | 1.884480 |
| S-LAH58 | 1.882997 | 1.876560 | 1.898221 | 1.910497 | 1.888146 |
| S-LAH60 | 1.834000 | 1.827376 | 1.849819 | 1.862781 | 1.839323 |
| S-LAL18 | 1.729157 | 1.725101 | 1.738436 | 1.745696 | 1.732336 |
| S-NPH4 | 1.892860 | 1.880484 | 1.924335 | 1.952371 | 1.903144 |
| S-TIL6 | 1.531717 | 1.528456 | 1.539343 | 1.545473 | 1.534304 |
| S-YGH51 | 1.754999 | 1.750624 | 1.765055 | 1.772956 | 1.758437 |

| Ideal lens | |
|---|---|
| Displacement position | 57 (Pupil) |
| Focal length | 7.9572 |

Example 6

| Unit mm | | | | | |
|---|---|---|---|---|---|
| Surface data | | | | | |
| Surface no. | r | d | GLA | nd | vd | ER |
| Object plane | ∞ | 16.8189 | | 1. | | |
| 1 | ∞ | 0.2355 | C1 | 1.76900 | 64.15 | 1.177U |
| 2 | ∞ | 0.0673 | | 1. | | 1.177U |
| 3* | 1.7625 | 0.3364 | L-LAH53-M | 1.80258 | 40.72 | 0.858U |
| 4* | 0.3519 | 0.5066 | | 1. | | 0.538U |
| 5 | ∞ | 1.7660 | S-LAH58 | 1.88300 | 40.76 | 1.208U |
| 6 | ∞ | 3.5118 | S-LAH58 | 1.88300 | 40.76 | 1.208U |
| 7 | ∞ | 0.5247 | S-LAH58-M | 1.87933 | 40.60 | 1.208U |
| 8* | −2.6675 | 1.6091 | | 1. | | 1.208U |
| 9 | 6.6660 | 1.0455 | S-NPH4 | 1.89286 | 20.36 | 1.208U |
| 10 | 2.1779 | 0.9140 | S-FPL55 | 1.43875 | 94.66 | 1.208U |
| 11 | −5.1887 | 1.1148 | | 1. | | 1.208U |
| 12 | 10.7718 | 0.7503 | S-BSL7 | 1.51633 | 64.14 | 1.261U |
| 13 | 2.5437 | 1.9334 | S-FPL55 | 1.43875 | 94.66 | 1.261U |
| 14 | −5.7530 | 2.4894 | | 1. | | 1.261U |
| 15 | ∞ | 1.7323 | | 1. | | 1.346U |
| 16 | 5.7699 | 11.1004 | S-BAL35 | 1.58913 | 61.14 | 1.261U |
| 17 | ∞ | 0.2624 | | 1. | | 1.261U |
| 18 | 7.5584 | 1.0865 | S-FPL55 | 1.43875 | 94.66 | 1.261U |
| 19 | −2.8266 | 1.5675 | S-YGH51 | 1.75500 | 52.32 | 1.261U |
| 20 | −5.4221 | 1.3656 | | 1. | | 1.236U |
| 21 | 5.4221 | 1.5675 | S-YGH51 | 1.75500 | 52.32 | 1.261U |
| 22 | 2.8266 | 1.0865 | S-FPL55 | 1.43875 | 94.66 | 1.261U |
| 23 | −7.5584 | 0.2624 | | 1. | | 1.261U |
| 24 | ∞ | 11.1004 | S-BAL35 | 1.58913 | 61.14 | 1.261U |
| 25 | −5.7699 | 1.7323 | | 1. | | 1.261U |
| 26 | ∞ | 1.7323 | | 1. | | 1.346U |
| 27 | 5.7699 | 11.1004 | S-BAL35 | 1.58913 | 61.14 | 1.261U |
| 28 | ∞ | 0.2624 | | 1. | | 1.261U |
| 29 | 7.5584 | 1.0865 | S-FPL55 | 1.43875 | 94.66 | 1.261U |
| 30 | −2.8266 | 1.5675 | S-YGH51 | 1.75500 | 52.32 | 1.261U |
| 31 | −5.4221 | 1.3656 | | 1. | | 1.236U |
| 32 | 5.4221 | 1.5675 | S-YGH51 | 1.75500 | 52.32 | 1.261U |
| 33 | 2.8266 | 1.0865 | S-FPL55 | 1.43875 | 94.66 | 1.261U |
| 34 | −7.5584 | 0.2624 | | 1. | | 1.261U |
| 35 | ∞ | 11.1004 | S-BAL35 | 1.58913 | 61.14 | 1.261U |
| 36 | −5.7699 | 1.7323 | | 1. | | 1.261U |
| 37 | ∞ | 1.7323 | | 1. | | 1.346U |
| 38 | 5.7699 | 11.1004 | S-BAL35 | 1.58913 | 61.14 | 1.261U |
| 39 | ∞ | 0.2624 | | 1. | | 1.261U |
| 40 | 7.5584 | 1.0865 | S-FPL55 | 1.43875 | 94.66 | 1.261U |
| 41 | −2.8266 | 1.5675 | S-YGH51 | 1.75500 | 52.32 | 1.261U |
| 42 | −5.4221 | 0.6828 | | 1. | | 1.261U |
| 43(Stop) | ∞ | 0.6828 | | 1. | | 1.150U |
| 44 | 5.4221 | 1.5675 | S-YGH51 | 1.75500 | 52.32 | 1.261U |
| 45 | 2.8266 | 1.0865 | S-FPL55 | 1.43875 | 94.66 | 1.261U |
| 46 | −7.5584 | 0.2624 | | 1. | | 1.261U |
| 47 | ∞ | 11.1004 | S-BAL35 | 1.58913 | 61.14 | 1.261U |
| 48 | −5.7699 | 1.7323 | | 1. | | 1.261U |
| 49 | ∞ | 5.4930 | | 1. | | 1.682U |

-continued

| Unit mm | | | | | | |
|---|---|---|---|---|---|---|
| 50 | 11.3991 | 1.5810 | S-FPL51 | 1.49700 | 81.54 | 1.682U |
| 51 | 7.8685 | 0.2355 | | 1. | | 1.682U |
| 52 | ∞ | 0.5046 | S-LAH60 | 1.83400 | 37.16 | 1.682U |
| 53 | 4.4647 | 3.3638 | S-BAL35 | 1.58913 | 61.14 | 1.682U |
| 54 | −6.7958 | 2.0855 | | 1. | | 1.682U |
| 55 | ∞ | 1.0091 | C2 | 1.76819 | 71.70 | 1.514U |
| 56 | ∞ | 3.5319 | | 1. | | 1.514U |
| 57 | ∞ | 8.1540 | | 1. | | 1.023 |
| Image plane | ∞ | | | | | |

Aspherical surface data

3rd surface k = −0.3135
A2 = 0.0000E+00, A4 = −1.0093E−01, A6 = 2.5070E−02,
A8 = 0.0000E+00, A10 = 0.0000E+00

4th surface k = −0.7356
A2 = 0.0000E+00, A4 = −7.2706E−02, A6 = −1.3322E+00,
A8 = 0.0000E+00, A10 = 0.0000E+00

8th surface k = 0.0836
A2 = 0.0000E+00, A4 = 5.0230E−03, A6 = 0.0000E+00,
A8 = 0.0000E+00, A10 = 0.0000E+00

| Various data | |
|---|---|
| OB | 16.8189 |
| FOV | 89.9 |
| NAI | 0.1257 |
| IH | 1.00 |
| IHtotal | 1.022 |

| Glass material data | | | | | |
|---|---|---|---|---|---|
| GLA | 587.56 | 656.27 | 486.13 | 435.83 | 546.07 |
| C2 | 1.768189 | 1.765244 | 1.775956 | 1.783503 | 1.770656 |
| C1 | 1.768999 | 1.765391 | 1.777377 | 1.784102 | 1.771846 |
| L-LAH53-M | 1.802580 | 1.796720 | 1.816430 | 1.827650 | 1.807260 |
| S-BAL35 | 1.589130 | 1.586188 | 1.595824 | 1.601034 | 1.591429 |
| S-BSL7 | 1.516330 | 1.513855 | 1.521905 | 1.526214 | 1.518251 |
| S-FPL51 | 1.496999 | 1.495136 | 1.501231 | 1.504507 | 1.498455 |
| S-FPL55 | 1.438750 | 1.437328 | 1.441963 | 1.444438 | 1.439857 |
| S-LAH58-M | 1.879330 | 1.872890 | 1.894550 | 1.906830 | 1.884480 |
| S-LAH58 | 1.882997 | 1.876560 | 1.898221 | 1.910497 | 1.888146 |
| S-LAH60 | 1.834000 | 1.827376 | 1.849819 | 1.862781 | 1.839323 |
| S-NPH4 | 1.892860 | 1.880484 | 1.924335 | 1.952371 | 1.903144 |
| S-YGH51 | 1.754999 | 1.750624 | 1.765055 | 1.772956 | 1.758437 |

| Ideal lens | |
|---|---|
| Displacement position | 57 (Pupil) |
| Focal length | 7.9509 |

Next, values of conditional expressions in each example are given below.

| | Example1 | Example2 | Example3 |
|---|---|---|---|
| (1) \|(Flag − FLaC)/FLad\| | 0.018 | 0.032 | 0.045 |
| (2) FLob/FLad | 1.135 | 1.246 | 1.555 |
| (3) \|FLob/R\| | 0.000 | 0.000 | 0.000 |
| (4) \|{(1 − βg) × γg − (1 − βC) × γC}/{(1 − βd) × γd}\| | 0.023 | 0.037 | 0.049 |

| | Example4 | Example5 | Example6 |
|---|---|---|---|
| (1) \|(Flag − FLaC)/FLad\| | 0.026 | 0.005 | 0.010 |
| (2) FLob/FLad | 1.082 | 0.917 | 0.730 |
| (3) \|FLob/R\| | 0.094 | 0.094 | 0.092 |
| (4) \|{(1 − βg) × γg − (1 − βC) × γC}/{(1 − βd) × γd}\| | 0.028 | 0.000 | 0.002 |

In Numerical data of each example, a value of the image height is one. The value of the image height is a value which is normalized. Therefore, when Numerical data described in each example is multiplied by a coefficient, for example Numerical data is tripled, and a unit of length is millimeter, the image height is 3 mm (an image circle is 6 mm). In this case, the optical system for rigid endoscope of each example is suitable for an optical system of a laparoscope having an insertion part of which a diameter is 10 mm.

Figure 25:
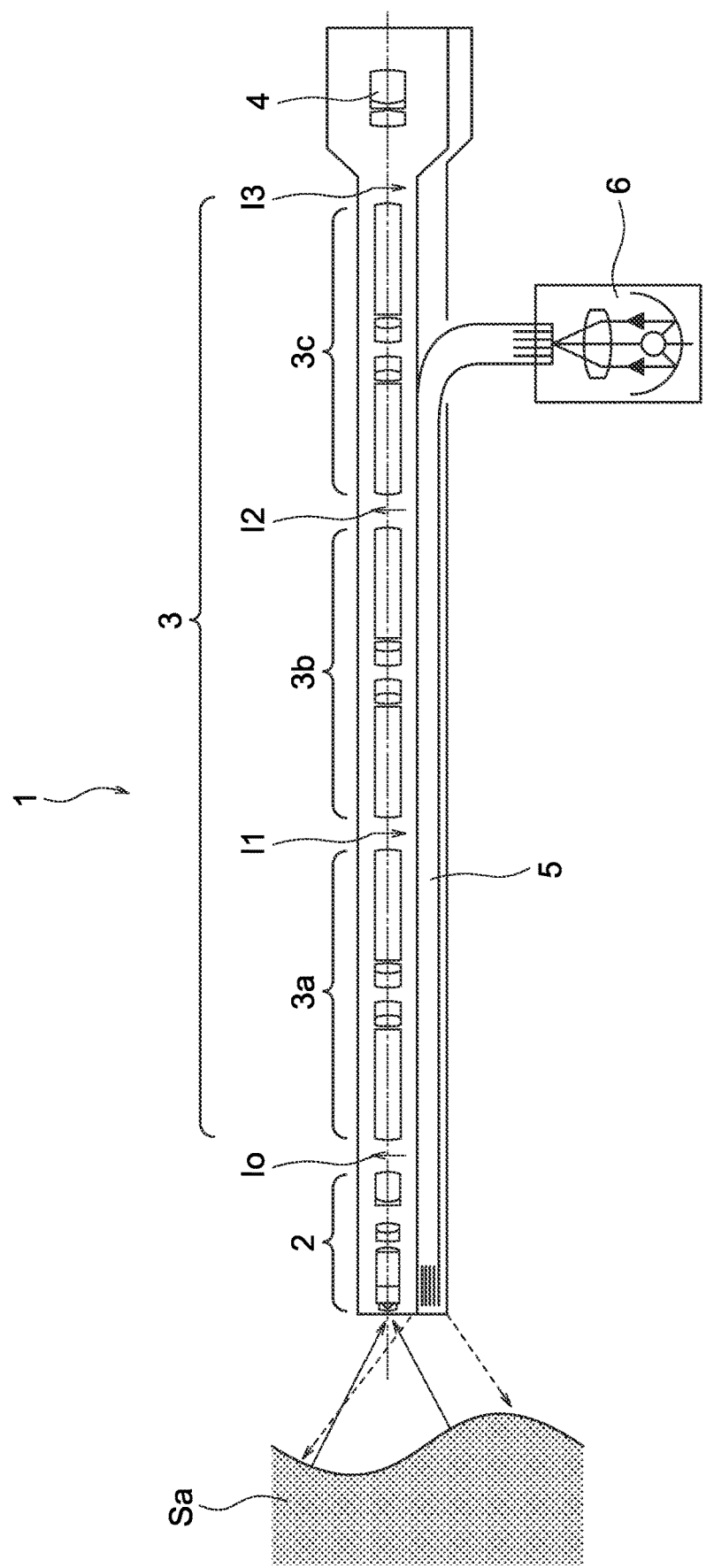
FIG. 25 is a schematic arrangement diagram of a rigid endoscope.

An example of a rigid endoscope will be described below. FIG. 25 is a schematic structural view of the rigid endoscope. A rigid endoscope 1 includes an objective optical system 2, an image relay unit 3, and an eyepiece optical system 4. Furthermore, the rigid endoscope 1 includes a light guide 5 and an illuminating-unit light source 6.

The image relay unit 3 includes a first relay optical system 3a, a second relay optical system 3b, and a third relay optical system 3c. The relay optical system of the example 1 is used for three relay optical systems.

Illuminating light is emerged from the illuminating-unit light source 6. The illuminating light, upon passing through the light guide 5, is emerged from a front end of the rigid endoscope. Accordingly, the illuminating light is irradiated to an observation object Sa.

A primary image Io of the observation object Sa is formed by the objective optical system 1. The primary image Io is relayed by the first relay optical system 3a. Accordingly, a first relay image I1 is formed. The first relay image I1 is relayed by the second relay optical system 3b. Accordingly, a second relay image I2 is formed. The second relay image I2 is relayed by the third relay optical system 3c. Accordingly, a third relay image I3 is formed. It is possible to observe the third relay image I3 by the eyepiece optical system OC.

According to the present disclosure, it is possible to provide an objective optical system in which a degradation of imaging performance occurred due to the correction of the inclination of image is suppressed even while having a large numerical aperture, and an optical system for rigid endoscope and a rigid endoscope using the objective optical system.

As described heretofore, the present disclosure is suitable for an objective optical system in which a degradation of imaging performance occurred due to the correction of the inclination of image is suppressed even while having a large numerical aperture, and an optical system for rigid endoscope and a rigid endoscope using the objective optical system.

What is claimed is:

1. An objective optical system, comprising in order from an object side:
   a front unit having a positive refractive power; and
   a rear unit comprising at least one lens, wherein:
   the front unit includes in order from the object side, a first lens having a negative refractive power, a second lens having a positive refractive power, and a third lens having a positive refractive power, and
   the following conditional expression (1) is satisfied:

$$|(FLag-FLaC)/FLad|<0.05 \quad (1)$$

where:
   FLad denotes a focal length for a d-line of the front unit,
   FLag denotes a focal length for a g-line of the front unit, and
   FLaC denotes a focal length for a C-line of the front unit.

2. The objective optical system according to claim 1, wherein the following conditional expression (2) is satisfied:

$$0.5<FLob/FLad<2 \quad (2)$$

where:
   FLob denotes a focal length for a d-line of the objective optical system, and
   FLad denotes the focal length for the d-line of the front unit.

3. The objective optical system according to claim 1, wherein the following conditional expression (3) is satisfied:

$$|FLob/R|<0.1 \quad (3)$$

where:
   FLob denotes a focal length for a d-line of the objective optical system, and
   R denotes a radius of curvature of a surface nearest to object in the rear unit.

4. The objective optical system according to claim 1, wherein the front unit consists of the first lens, the second lens, and the third lens.

5. The objective optical system according to claim 1, wherein the third lens includes a single lens or a cemented lens.

6. The objective optical system according to claim 5, wherein:
   the third lens is a cemented lens, and
   the cemented lens includes in order from the object side, a negative lens and a positive lens.

7. An optical system for a rigid endoscope comprising:
   the objective optical system according to claim 1;
   a relay optical system; and
   an eyepiece optical system.

8. A rigid endoscope comprising:
   the optical system for a rigid endoscope according to claim 7; and
   an illuminating optical system.

* * * * *